US012679282B2

(12) United States Patent
Taylor

(10) Patent No.: US 12,679,282 B2
(45) Date of Patent: Jul. 14, 2026

(54) VEHICLE-MOUNTABLE RACK

(71) Applicant: Shingleback Off Road Pty Ltd,
Beechworth (AU)

(72) Inventor: Andrew Taylor, Beechworth (AU)

(73) Assignee: Shingleback Off Road Pty Ltd,
Beechworth (AU)

( * ) Notice: Subject to any disclaimer, the term of this
patent is extended or adjusted under 35
U.S.C. 154(b) by 51 days.

(21) Appl. No.: 18/026,967

(22) PCT Filed: Sep. 17, 2021

(86) PCT No.: PCT/AU2021/051081
§ 371 (c)(1),
(2) Date: Mar. 17, 2023

(87) PCT Pub. No.: WO2022/056600
PCT Pub. Date: Mar. 24, 2022

(65) Prior Publication Data
US 2023/0365068 A1     Nov. 16, 2023

(30) Foreign Application Priority Data

Sep. 18, 2020   (AU) ................................ 2020903354

(51) Int. Cl.
*B60R 9/10*          (2006.01)
*B60R 9/06*          (2006.01)
(Continued)

(52) U.S. Cl.
CPC ................. *B60R 9/10* (2013.01); *B60R 9/06*
(2013.01); *B62H 3/12* (2013.01); *B60R*
*2011/008* (2013.01)

(58) Field of Classification Search
CPC ........ B60R 9/10; B60R 9/06; B60R 2011/008
See application file for complete search history.

(56) References Cited

U.S. PATENT DOCUMENTS 4,046,273 A * 9/1977 Hughes ................. B60P 3/1008
414/462
11,091,099 B1 * 8/2021 Shen ......................... B60R 9/06
(Continued)

FOREIGN PATENT DOCUMENTS

WO     WO-2020033256 A1 * 2/2020 ............... B60R 9/06

OTHER PUBLICATIONS

Oct. 25, 2021—(WO) International Search Report and Written
Opinion—Appln No. PCT/AU2021/051081.
Oct. 14, 2025—(AU) Examination Report—App. 2024227620.

*Primary Examiner* — Derek J Battisti
(74) *Attorney, Agent, or Firm* — Banner & Witcoff, Ltd.

(57) ABSTRACT
Disclosed is a rack, or carrier, mountable to a vehicle and
components for a rack. The rack in a preferred embodiment
of the invention is a bike rack. In other preferred embodi-
ments, the rack may be a utility rack for carrying other items,
tools, or equipment. The rack includes a carrier portion on
which one or more items can be loaded, a vehicle-coupling
portion pivotably coupled to the carrier portion, the vehicle-
coupling portion being couplable to a vehicle, and a linkage
for connecting the carrier portion to the vehicle-coupling
portion. The linkage is configured to bias the carrier portion
to a substantially upright position relative to the vehicle-
coupling portion when the vehicle-coupling portion is
coupled to the vehicle, and to support the carrier portion
relative to the vehicle-coupling portion when the carrier
portion is in a lowered position and loaded with one or more
items.

18 Claims, 24 Drawing Sheets

(51) Int. Cl.
     B60R 11/00          (2006.01)
     B62H 3/12           (2006.01)

(56)                    References Cited

U.S. PATENT DOCUMENTS

| | | | | |
|---|---|---|---|---|
| 11,643,001 | B1 * | 5/2023 | Thompson | B62K 7/04 |
| | | | | 414/462 |
| 2003/0057243 | A1 | 3/2003 | Himel, Jr. | |
| 2009/0120984 | A1 * | 5/2009 | Sautter | B60R 9/10 |
| | | | | 224/532 |
| 2014/0151421 | A1 | 6/2014 | Loken | |
| 2017/0190299 | A1 | 7/2017 | Molina | |
| 2018/0354427 | A1 * | 12/2018 | Yazdian | B60R 9/10 |
| 2019/0161022 | A1 | 5/2019 | McFadden et al. | |
| 2020/0406830 | A1 * | 12/2020 | Owen | B62H 3/12 |

* cited by examiner

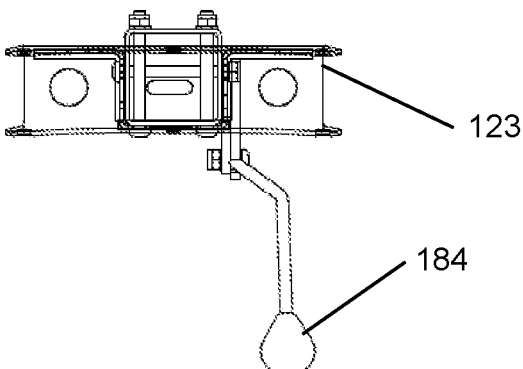
123
184
Figure 7
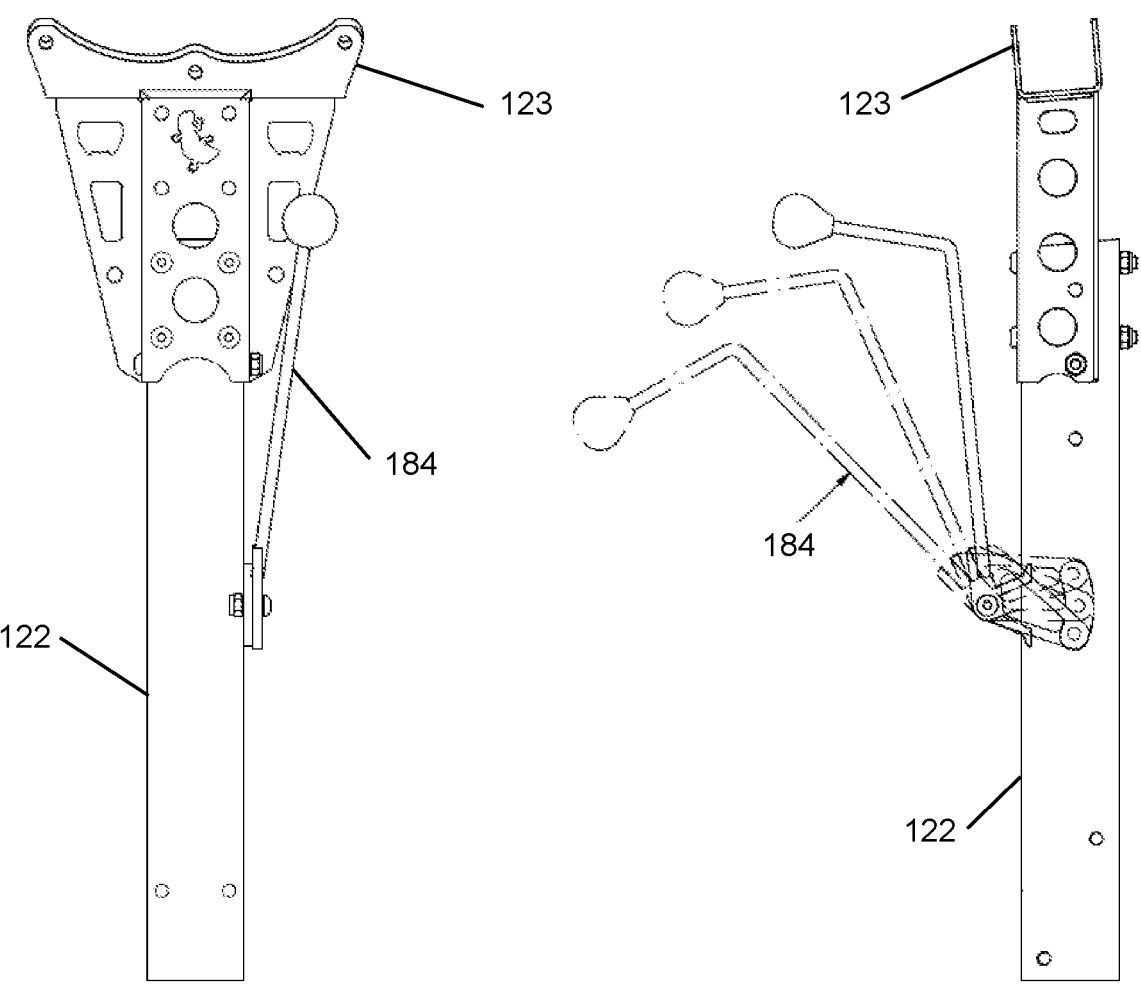
123
184
122
123
184
122
Figure 8
Figure 9

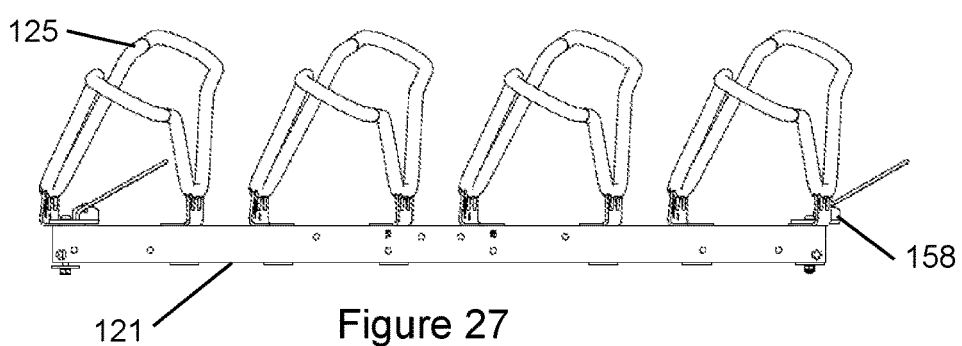
Figure 26
Figure 27
Figure 29
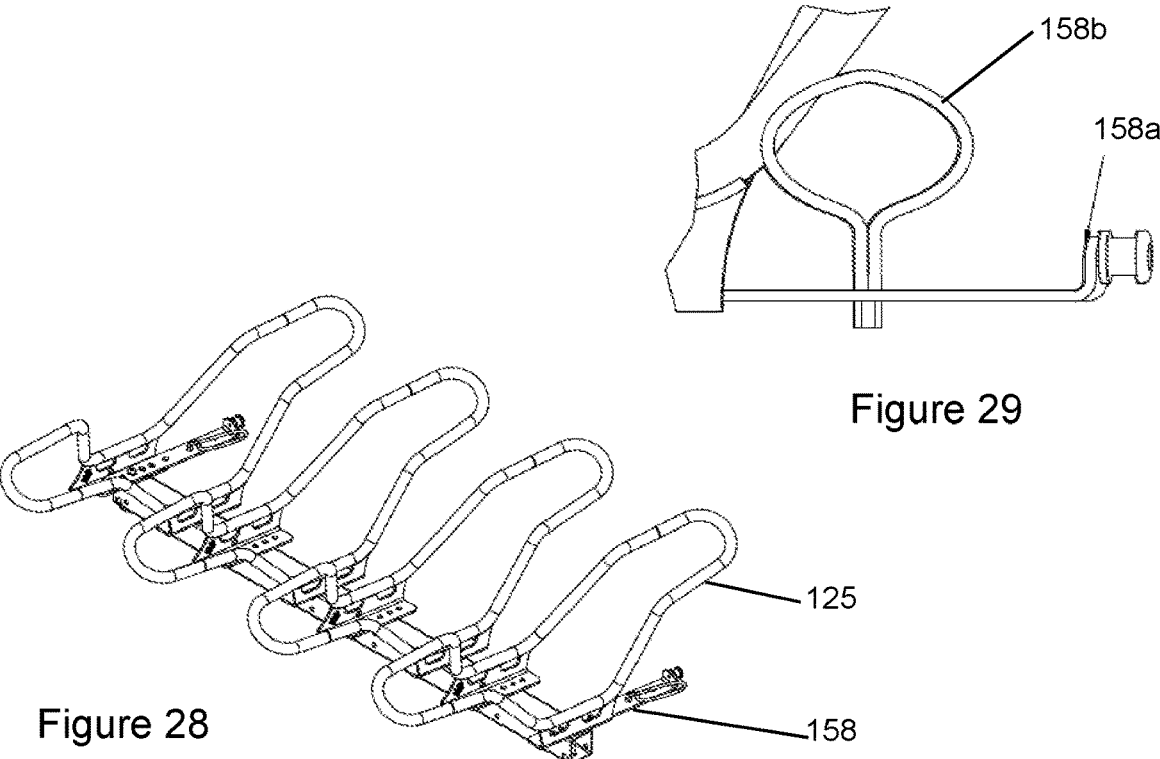
Figure 28

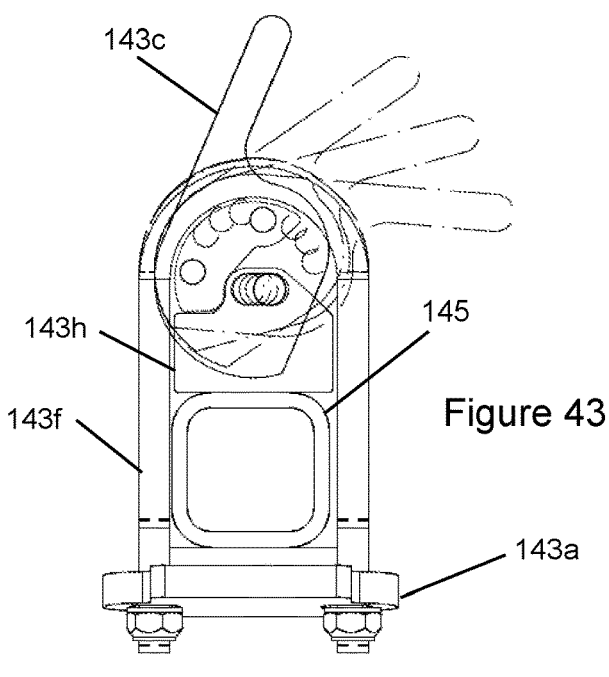
143c
143h
143f
145
Figure 43
143a
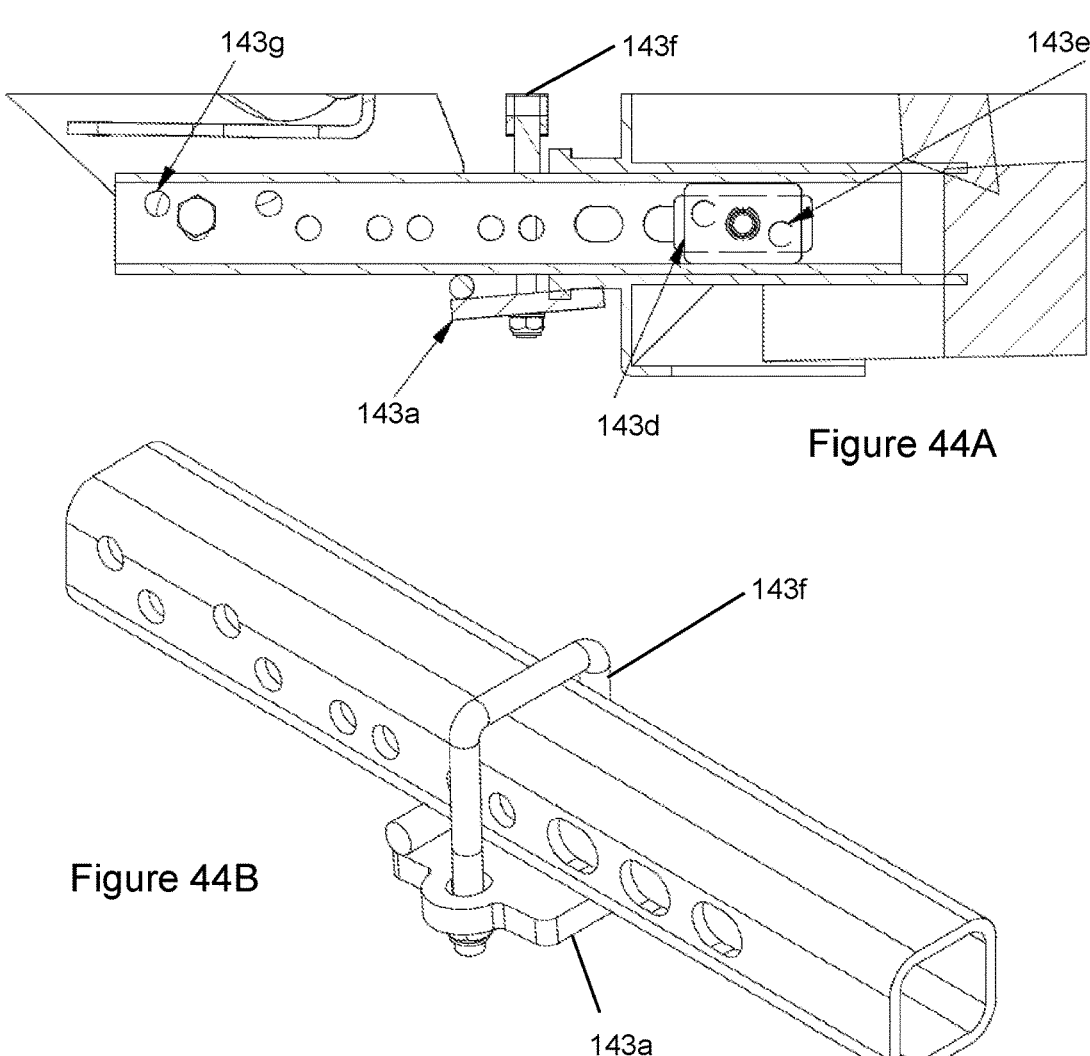
143g
143f
143e
143a
143d
Figure 44A
Figure 44B
143f
143a

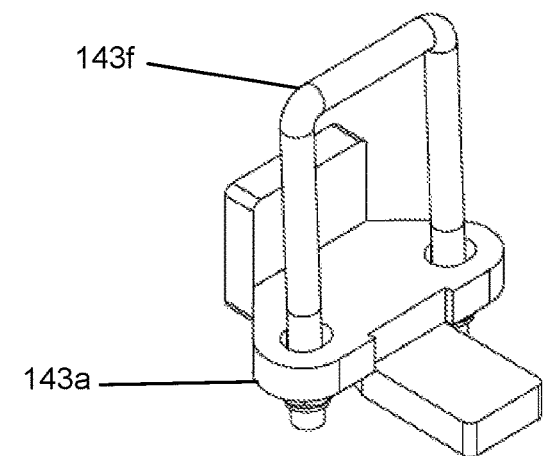
143f
143a
Figure 45A
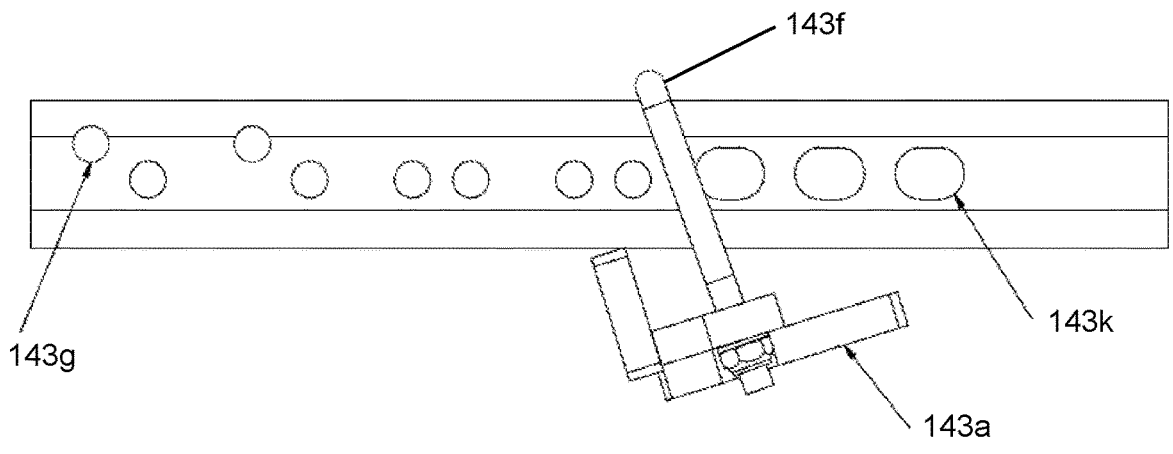
143f
145
143a
Figure 45B
143f
143g
143k
143a
Figure 45C

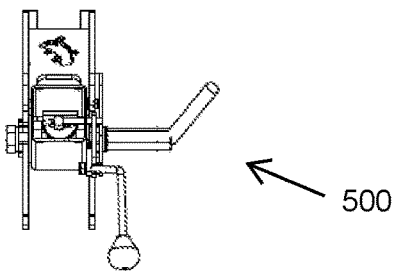
Figure 46
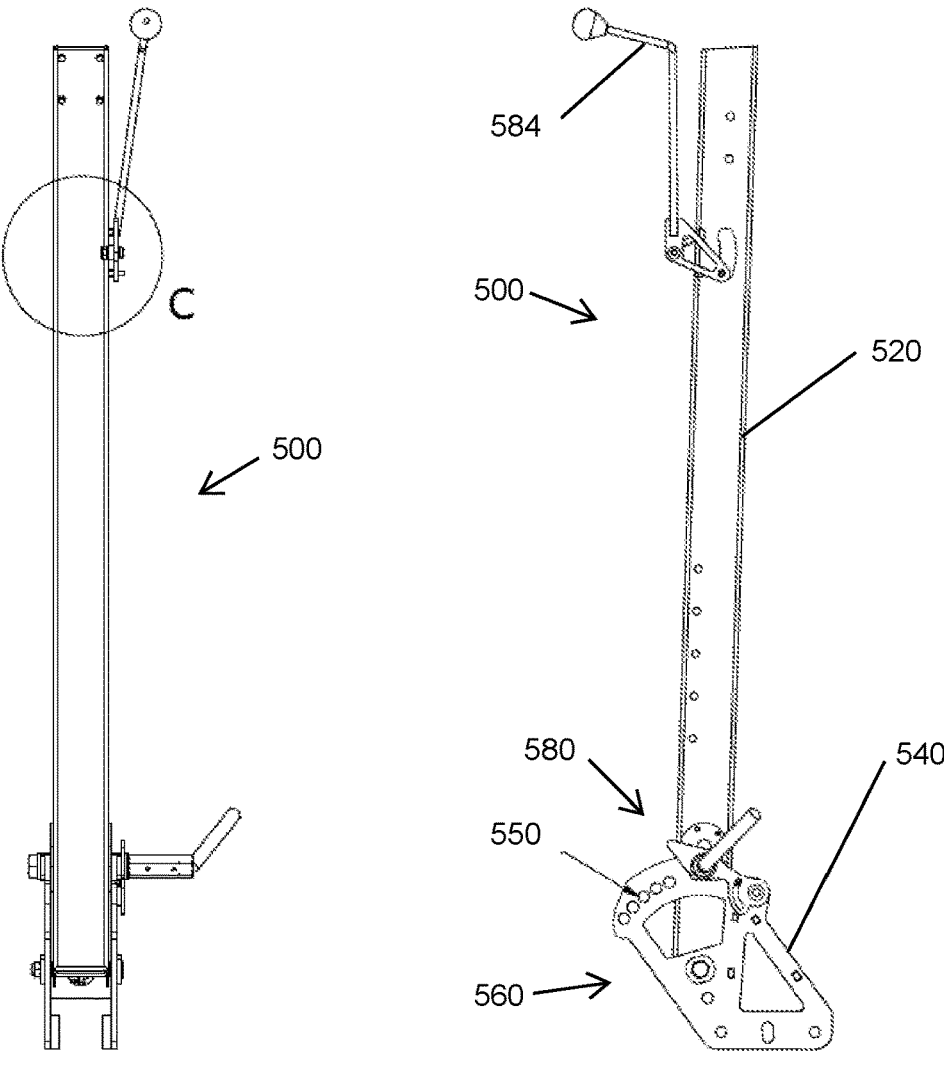
Figure 47
Figure 48

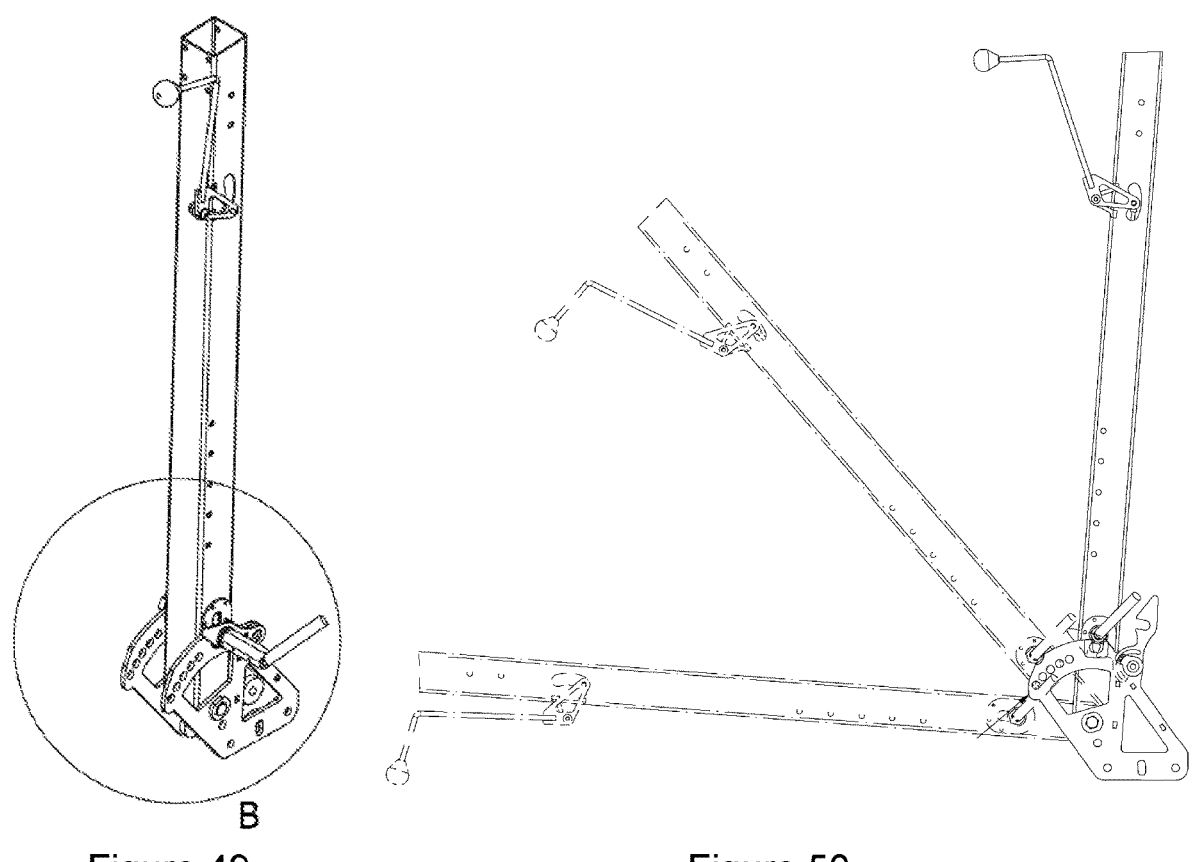
B
Figure 49
Figure 50
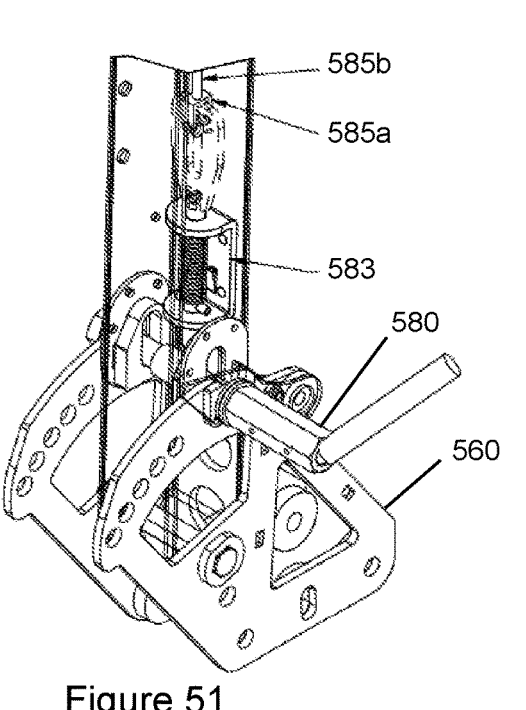
585b
585a
583
580
560
Figure 51
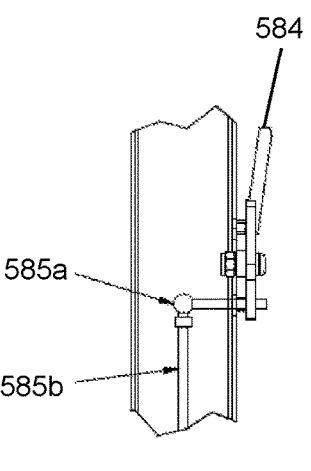
584
585a
585b
Figure 52

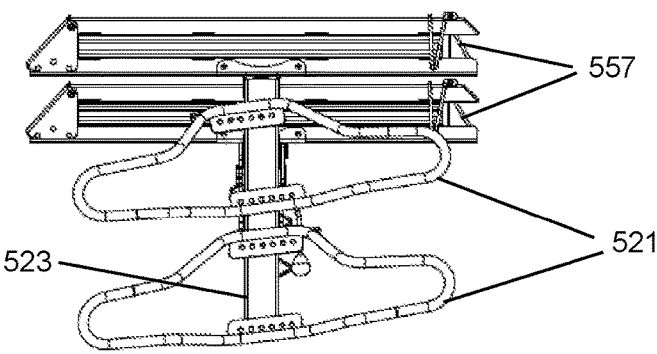
Figure 53
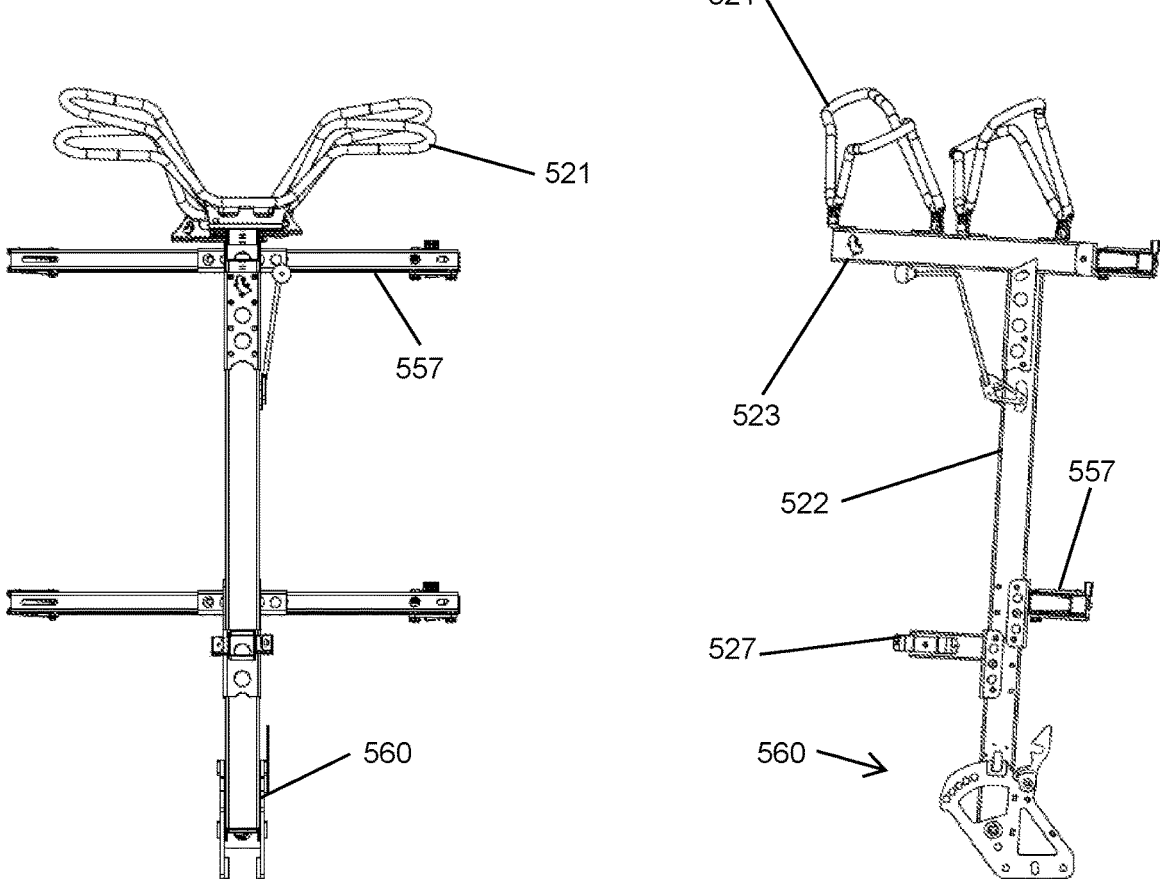
Figure 54
Figure 55

621

621

620

620

622

627

621

VEHICLE-MOUNTABLE RACK

CROSS-REFERENCE TO RELATED APPLICATIONS

The present application is a U.S. National Phase Entry under 35 U.S.C. § 371 of International PCT Application No. PCT/AU2021/051081 having an international filing date of Sep. 17, 2021, which claims priority to Australian Application 2020903354 filed Sep. 18, 2020. Benefit of the filing date of each of these prior applications is hereby claimed. Each of these applications is hereby incorporated by reference in its entirety.

FIELD OF THE INVENTION

The invention relates to a rack, or carrier, mountable to a vehicle and components for a rack. The rack in a preferred embodiment of the invention is a bike rack. In other preferred embodiments, the rack may be a utility rack for carrying other items, tools, or equipment.

PRIOR APPLICATION

The present application claims priority from Australian Provisional Application No. 2020903354 titled "Bike rack" as filed on 18 Sep. 2020, the content of which is hereby incorporated by reference in its entirety.

BACKGROUND

For existing vertical bike racks, short people and kids typically find it difficult to load the bikes onto the bike racks because they are unable to raise the bikes sufficiently high onto the bike racks. Similarly, it would be difficult for short people and kids to unload the bikes from the bike racks. Further, some of bicycles such as e-bikes are particularly heavy and can present a safety risk when loading or unloading from the bike rack.

Some existing vertical bike racks are adjustable to access the rear of the vehicle. However, for these existing bike racks all bikes must first be unloaded before the rack can be safely adjusted away from the vehicle. This process of unloading the bikes for the sake of accessing the rear of the vehicle is time consuming and requires sufficient space, which can be inconvenient. Further, the rear of some larger vehicles (such as vans for example) would not be accessible despite the bike rack being adjusted away from the vehicle because of the large size of the rear door.

In addition, because bikes come in different shapes and sizes, the user would need to carefully arrange the bikes, to the extent possible, to avoid any clearance issues between bikes. For example, there may be insufficient space on the bike rack to accommodate two larger bikes side-by-side and so, there would be a one-bike spacing between the two larger bikes for a smaller-sized bike.

Also, bike tyres when mounted to the existing bike racks could get worn out or even get damaged as they rub against the portions of the bike rack that hold the wheel in place.

Bike racks also tend to be dedicated to the single purpose of carrying bikes, but it may also be desirable to use a vehicle-mounted rack to carry other items or equipment, either instead of or in addition to bikes.

In this context, there is a need for an improved vehicle-mounted rack that overcomes one or more of the problems described above or that least provides the public with a useful choice.

SUMMARY OF THE INVENTION

According to an aspect of the present invention, there is provided a rack comprising: a carrier portion on which one or more items can be loaded; a vehicle-coupling portion pivotably coupled to the carrier portion, the vehicle-coupling portion being couplable to a vehicle; and a linkage for connecting the carrier portion to the vehicle-coupling portion, the linkage being configured: to bias the carrier portion to a substantially upright position relative to vehicle-coupling portion when the vehicle-coupling portion is coupled to the vehicle, and to support the carrier portion relative to the vehicle-coupling portion when the carrier portion is in a lowered position and loaded with one or more items.

The rack is a vehicle-mountable rack. For example, the rack may be a bike rack onto which one or more bicycles can be loaded. The bicycle may be a mountain bicycle, road bicycle, hybrid bicycle, an e-bicycle, kids bicycle, or a fat bicycle. In other embodiments, the rack may be a utility rack onto which one or more tools or equipment can be loaded.

The linkage preferably includes a traction spring for biasing the carrier portion to the substantially upright position. In other embodiments, the linkage includes a gas spring or gas strut. The linkage may include a biasing means or a biasing component for biasing the carrier portion. The biasing means may be a leaf spring, coil spring, torsion bar spring, a compression spring, or a tension spring. The biasing means may be made from steel for example. The linkage preferably further includes a rigid elongate bar for coupling the carrier portion to the vehicle-coupling portion. The linkage may also include a damper for resisting a movement of carrier portion to at least one of the upright position and the lowered position. For example, the damper may be configured or adapted to resist a pull of the carrier portion towards the upright position. The damper may additionally or alternatively be configured or adapted to resist a lowering of the carrier portion towards the lowered position. In yet other examples, the linkage may include a motorized linear actuator. The motorized linear actuator may be powered using a battery of the vehicle. In other examples, the actuator may be powered by a cordless drill or other cordless tools. The motorized linear actuator may be controlled via a user's smartphone or mobile device. In still further other examples, the linkage may include a hydraulic ram. In still further other examples, the linkage may be actuated by a hand winch or a pulley system with a cable.

The carrier portion may be pivotable relative to the vehicle-coupling portion between the substantially upright position and one or more lowered positions. The carrier in the substantially upright position may be tilted slightly forward towards the vehicle. Preferably, the carrier in the substantially upright position is between about 80° to 100° to the ground surface.

An angle between the carrier portion in the lowered position and the carrier portion in the upright position is up to about 70°. Preferably, the angle is up to about 60°. Further preferably, the angle is up to about 50°.

The rack preferably further includes a locking mechanism for locking the carrier portion relative to the vehicle-coupling portion at one of a plurality of mutually distinct positions. The vehicle-coupling portion may include a plurality of vertically-spaced apart retaining portions, each of the plurality of vertically-spaced retaining portions corresponding to a respective one of the plurality of mutually distinct locations of the carrier portion relative to the vehicle-coupling portion. Preferably, the locking mechanism includes a locking portion that is coupled to the carrier portion such that the locking portion and the carrier portion are pivotable relative to the vehicle coupling means in unison, and wherein the locking portion is removably engageable with one of the plurality of vertically-spaced retaining portions to retain a position of the carrier portion relative to the vehicle-coupling portion.

Each of the plurality of vertically-spaced retaining portions is preferably a slot, and the locking portion is removably insertable into the slot to lock the carrier portion relative to the vehicle coupling portion at a respective one of the plurality of mutually distinct locations. For example, the locking portion may be an elongate body or a guide portion that is slidable relative to the slot.

The locking portion is preferably biased towards the vehicle-coupling portion such that when the locking portion is aligned with a respective one of the plurality of retaining portions the locking portion would be biased into engagement with the respective retaining portion.

The locking portion, in preferred embodiments, can be fastened onto the vehicle-coupling portion to prevent removal of the locking portion from the vehicle-coupling portion. For example, once the locking portion is located in a respective one of the vertically-spaced retaining portions, the locking member can be configured to a locked position to prevent removal of the locking portion from the respective vertically-spaced retaining portion and can be configured to an unlocked position to allow removal of the locking portion from the respective vertically-spaced retaining portion. The locking portion may, for example, be a fastener that is locatable through the retaining portion, the fastener being actuatable to clamp the locking portion onto the vehicle-coupling portion.

The rack may further include a trapping portion that is adjustable relative to the vehicle-coupling portion to trap the locking portion in a respective one of the retaining portions. The trapping portion preferably has a first position in which the trapping portion traps the locking portion in the respective retaining portion and a second position in which the locking portion can be inserted or removed from the respective retaining portion. In an embodiment, when the locking portion is not received by the retaining portion, the trapping portion is displaceable, by the locking portion, from the first position to the second position, as the locking portion is moved towards the respective retaining portion such that the locking portion can be inserted into the respective retaining portion, and wherein the trapping portion returns to the first position to trap the locking member in the respective retaining portion. In the first position, the trapping portion may be engaged with or be coupled to the linkage. For example, the trapping portion may be magnetically couplable with the linkage.

The trapping portion is preferably capable of being retained in the second position when the carrier portion is in the substantially upright position, to allow the locking portion to be removed from the vehicle-coupling portion so that the carrier portion is free to pivot relative to the vehicle-coupling portion. The trapping portion may also be automatically released from the second position when the carrier portion is moved to the lowered position.

According to another aspect of the present invention, there is provided a vehicle-mountable vertical rack comprising: a mounting portion to which one or more items can be mounted, the mounting portion being an elongate body having a length that is adjustable to allow for a varying number of items to be mounted thereon.

The rack may be the rack of the previously described aspect.

The mounting portion may include an upper mounting portion to which a front wheel of a bike is mountable. The mounting portion may include a lower mounting portion to which a rear wheel of a bike is mountable.

The mounting portion preferably includes one or more elongate segments that are adjustable or engageable with the elongate body portion to adjust the length of the mounting portion. The segments may telescopingly engage the elongate body portion to adjust the length of the mounting portion. Alternatively, the elongate segment may be fastened onto the elongate body portion.

According to a further aspect of the present invention, there is provided a mounting portion for a vehicle-mountable vertical rack, the mounting portion having an adjustable length to allow for a varying number of items to be mounted thereon.

According to another aspect of the present invention, there is provided an extension for extending a total length of an elongate mounting body portion for a vehicle-mountable rack, the extension being engageable with the mounting portion to allow for one or more additional items to be mounted on the rack and having one or more engaging portions with which a portion of the item is cooperable to secure the item.

According to a further aspect of the present invention, there is provided a vehicle-mountable rack including: a vehicle-coupling portion for coupling the rack to a vehicle; an elongate support portion extending substantially vertically from the vehicle-coupling portion; and a mounting portion onto which an item is mountable, the mounting portion being locatable transversely to the elongate support portion, and being height-adjustable along a longitudinal axis relative to the elongate support portion.

The rack may be the rack of either of the previously described aspects.

The mounting portion may be an upper mounting portion.

The rack may further include a mounting-coupling portion for coupling the mounting portion to the elongate support portion, the mounting-coupling portion being attachable to the elongate support portion and being adjustable relative to the elongate bar to adjust a height of the mounting portion relative to the elongate support portion.

The mounting-coupling portion may be attachable to an end of the elongate support portion. The mounting-coupling portion preferably has a plurality of vertically-spaced apart apertures and the elongate bar has a plurality of vertically-spaced apart apertures near the end of the elongate support portion, wherein two or more apertures of the mounting-coupling portion are alignable with two or more apertures of the elongate support portion to adjust the height of the mounting portion relative to the elongate support portion, wherein a fastener is passable through aligned apertures to secure the mounting-coupling portion relative to the elongate support portion.

The mounting-coupling portion may be attachable along a length of the elongate support portion. The mounting-coupling portion may be a plate having a substantially diamond shape or rectangular shape with an aperture near each corner of the plate, wherein a first pair of oppositely-diagonal apertures are each for receiving a fastener to secure the plate to the mounting portion and a second pair of oppositely-diagonal apertures are each for receiving a fastener to secure the plate to the elongate support portion.

The elongate bar preferably has a plurality of apertures along a length of the elongate support portion, the plurality of apertures including two or more pairs of apertures that are alignable with the second pair of apertures of the plate each for receiving the fastener.

According to another aspect of the present invention, there is provided a bike rack including a mounting portion to which a wheel of a bike is mountable, the mounting portion including: a body portion on which a wheel of a bike is locatable; and a hoop portion in which the wheel of the bicycle is locatable, the hoop portion being engageable with the body portion by skewering a portion of the hoop portion and body portion with a vertically aligned fastener, wherein the hoop portion is adjustable rearwardly or forwardly relative to the body portion.

The bike rack may be the rack of any of the previously described aspects.

The hoop portion may also be adjustable rotationally relative to the body portion about a rotational axis that is substantially perpendicular to a longitudinal axis of the body portion.

The hoop portion may further include one or more removable inserts to narrow a section of the hoop portion.

The hoop portion may include a bracket portion having a plurality of apertures and the body portion includes a plurality of apertures, wherein at least two of the plurality of apertures of the bracket portion are alignable with at least two of the plurality of apertures of the body portion, wherein the fastener is insertable into the aligned apertures to secure a position of the hoop portion relative to the body portion.

A further aspect of the present invention provides a hoop portion for a bike rack, a wheel of a bike being locatable in the hoop portion, the hoop portion having a coupling portion for coupling to a body mounting portion by skewering a portion of the hoop portion and body portion with a vertically aligned fastener such that the hoop portion is adjustable rearwardly or forwardly relative to the body mounting portion to locate the wheel of the bike relative to the body portion.

Another aspect of the present invention provides a bike rack including a mounting portion to which a wheel of a bike is mountable, the mounting portion including an elongate body portion on which a wheel of a bike is locatable; and a wheel-receiving portion in which the wheel of the bike is locatable, the wheel-receiving portion having: a first base portion and a second base portion spaced apart from each other, each of the first and second base portion being mounted or mountable to the elongate body portion; a front portion for receiving a first portion of the wheel, the front portion having a pair of spaced apart arm portions between which the first portion of the wheel is receivable, each of the spaced apart arm portions extending from the first and second base portions respectively; a rear portion for receiving a second portion of the wheel, the rear portion having a pair of spaced apart arm portions between which the second portion of the wheel is receivable, each of spaced apart arm portions extending from the first and second base portions respectively, wherein for at least one of the front portion and rear portion of the wheel-receiving portion: the pair of spaced apart arm portions are tapered towards each other away at or near free ends thereof away from the first and second base portions so as to clamp edges of the respective wheel portion located therebetween.

The bike rack according to this aspect may be the rack of any of the previously described aspects above.

The at least one of the front portion and rear portion of the wheel-receiving portion may have an end portion such that the pair of spaced apart arm portions and the end portion form a substantially U-shape profile, the arm portions being tapered towards the end portion. An axis along which the end portion extends is preferably at an angle or at a tilt relative to the elongate body portion. By way of example, the axis along which the end portion extends is between about 30° to 60° relative to the elongate body portion. The axis along which the end portion extends is substantially parallel to an axis of rotation of the wheel received by the wheel-receiving portion.

The at least one of the front portion and rear portion may be both of the front portion and rear portion. Alternatively, the at least one of the front portion and the rear portion may only be the front portion. Further alternatively, the at least one of the front portion and the rear portion may only be the rear portion.

A further aspect of the present invention provides a wheel-receiving portion for a bike rack, a wheel of a bike being receivable by the wheel-receiving portion, the wheel-receiving portion having: a first base portion and a second base portion spaced apart from each other, each of the first and second base portion being mountable to an elongate body portion; a front portion for receiving a first portion of the wheel, the front portion having a pair of spaced apart arm portions between which the first portion of the wheel is receivable, each of the spaced apart arm portions extending from the first and second base portions respectively; a rear portion for receiving a second portion of the wheel, the rear portion having a pair of spaced apart arm portions between which the second portion of the wheel is receivable, each of spaced apart arm portions extending from the first and second base portions respectively, wherein for at least one of the front portion and rear portion of the wheel-receiving portion: the pair of spaced apart arm portions are tapered towards each other away at or near free ends thereof away from the first and second base portions so as to clamp edges of the respective wheel portion located therebetween.

The at least one of the front portion and rear portion of the wheel-receiving portion preferably has an end portion such that the pair of spaced apart arm portions and the end portion form a substantially U-shape profile, the arm portions being tapered towards the end portion. An axis along which the end portion extends may be at an angle relative to the elongate body portion. For example, the axis along which the end portion extends is between about 30° to 60° relative to the elongate body portion when the first and second base portions are mounted thereto. The axis along which the end portion extends is preferably substantially parallel to an axis of rotation of the wheel received by the wheel-receiving portion.

The at least one of the front portion and rear portion may be both of the front portion and rear portion. Alternatively, the at least one of the front portion and the rear portion may only be the front portion. Further alternatively, the at least one of the front portion and the rear portion may only be the rear portion.

Yet another aspect of the present invention provides a bike rack having a vehicle-coupling portion having a fastener portion passable laterally through the vehicle-coupling portion and the tow portion of the vehicle to which the vehicle-coupling portion is coupled.

It will be appreciated that the broad forms of the invention and their respective features can be used in conjunction and/or independently, and reference to separate broad forms is not intended to be limiting. Furthermore, it will be appreciated that features of the method can be performed using the system or apparatus and that features of the system or apparatus can be implemented using the method.

BRIEF DESCRIPTION OF THE DRAWINGS

The invention will now be described, by way of non-limiting example only, with reference to the accompanying drawings, in which:

FIG. 7 shows a top view of an upper part of a carrier portion of the rack from FIG. 1;

FIG. 8 shows a rear view of the upper part of the carrier portion from FIG. 7;

FIG. 9 shows a side view of the upper part of the carrier portion from FIG. 7, with various positions of a handle portion shown in broken lines;

FIG. 26 shows a top view of an upper mounting portion with both hoop portions and equipment securing portions attached;

FIG. 27 shows a rear view of the arrangement from FIG. 26;

FIG. 28 shows an isometric view of the arrangement from FIG. 26;

FIG. 29 shows a side view of the equipment securing portion from FIG. 26;

FIG. 43 shows a front view of a cam from FIGS. 42A and 42B, with broken lines illustrating the operation of the cam;

FIG. 44A shows a cross sectional side view of the vehicle-coupling portion from FIG. 42A;

FIG. 44B shows an isometric view of an alternative embodiment of the vehicle-coupling portion;

FIG. 45A shows an isometric view of a support plate and a U-shaped bolt from yet another embodiment of the vehicle coupling portion;

FIG. 45B shows an isometric view of the vehicle coupling portion according to the embodiment of FIG. 45A;

FIG. 45C shows a side view of the vehicle coupling portion from FIG. 45B;

FIG. 46 shows a top view of another embodiment of the rack;

FIG. 47 shows a rear view of the rack from FIG. 46;

FIG. 48 shows a side view of the rack from FIG. 46;

FIG. 49 shows an isometric view of the rack from FIG. 46;

FIG. 50 shows a side view of the rack from FIG. 46 in the substantially upright position, with broken lines illustrating a partially lowered position and the lowered position;

FIG. 51 shows an enlarged portion of FIG. 49 as illustrated by Detail B;

FIG. 52 shows an enlarged cross sectional portion of FIG. 47 as illustrated by Detail C;

FIG. 53

DETAILED DESCRIPTION

FIGS. 1 to 6 show a rack 100 according to an embodiment of the present invention. In various configurations, the rack may be a bike rack onto which one or more bikes can be loaded, or alternatively a utility rack onto which one or more items, tools or equipment can be loaded such as snowboards, skis, fishing rods, a kayak, a storage trunk, tool box, shovels, rake, or other tools or equipment.

Figures 1, 2, 3:
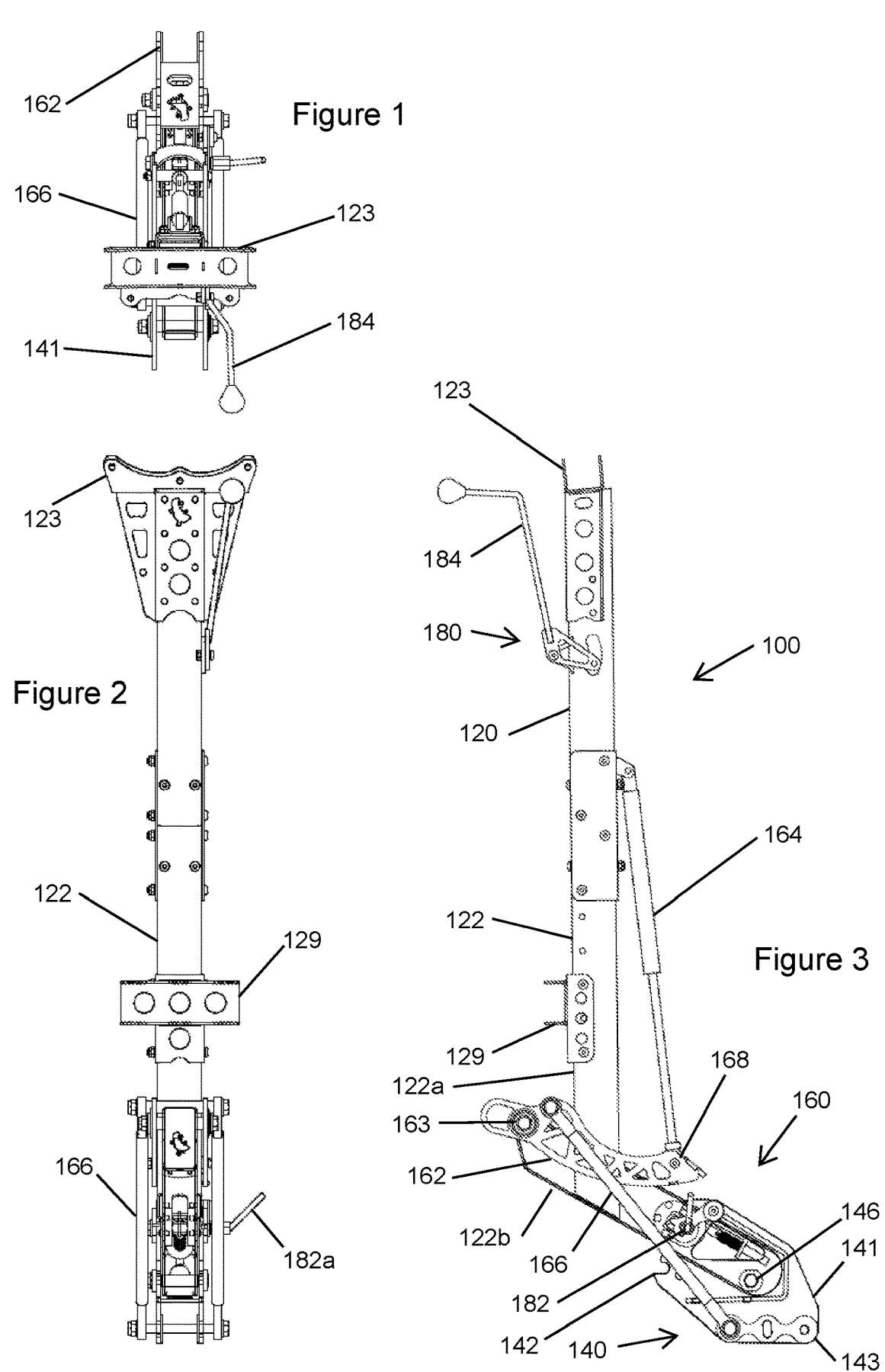
FIG. 1 shows a top view of a rack according to an embodiment of the present invention in a substantially upright position.
FIG. 2 shows a rear view of the rack from FIG. 1.
FIG. 3 shows a side view of the rack from FIG. 1.

Referring in particular to FIG. 3, the rack 100 has a carrier portion 120 on which mounting assemblies can be attached, on which one or more bicycles (or bikes) or other items can be mounted. The rack 100 also has a vehicle-coupling portion 140 for coupling the rack 100 to a vehicle. In the situation where bicycles are to be mounted to the rack 100, the bicycle may be a mountain bicycle, road bicycle, hybrid bicycle, e-bicycle, kids bicycle, or a fat bicycle.

Figure 6:
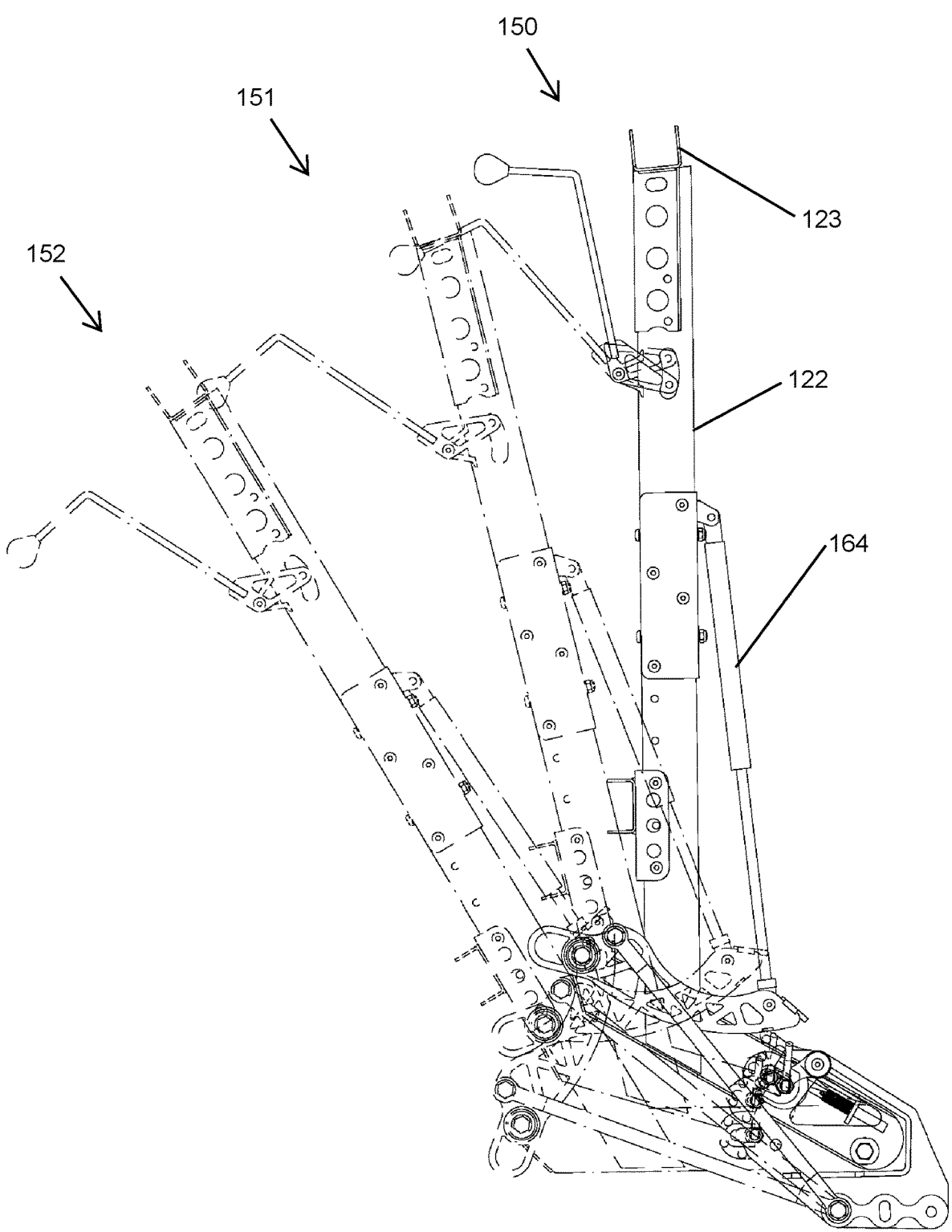
FIG. 6 shows a side view of the rack from FIG. 1, with a partially lowered position and a lowered position shown in broken lines, in addition to the substantially upright position.

In preferred embodiments, the vehicle-coupling portion 140 is engageable or can be coupled with a tow bar of the vehicle. The vehicle-coupling portion 140 will typically also include a tow bar-coupling component that is not shown in these Figures but will be described in more detail below. The carrier portion 120 of the rack 100 is adjustable relative to the vehicle-coupling portion 140. FIG. 6 shows the carrier portion 120 in a range of positions. At the right in solid lines it is shown in a substantially upright position 150, while the far left in broken lines the carrier portion 120 is shown in a downward (or tilted, or lowered) position 152 away from a rear of the vehicle. An intermediate position 151 is also shown in broken lines between the substantially upright position 150 and the downward position 152.

When in the 'substantially upright position', the carrier portion 120 may be at about 80° to 100° to the ground surface. Further preferably, when in the upright position, the carrier portion is tilted slightly forward towards the vehicle. In the downward position, a user can easily mount or dismount a bicycle or other item with respect to the carrier portion 120. In addition, in the lowered position, the user is able to open the rear (or boot) door of the vehicle.

The carrier portion 120, according to preferred embodiments of the present invention, is pivotable relative to the vehicle-coupling portion 140. A pivotable range of the carrier portion 120 from the upright position to the downward position is up to about 70°. In other examples, the pivotable range of the carrier portion may be up to about 60° or up to about 50°.

The carrier portion 120 is in particular pivotable away from the vehicle such that a large door of a larger vehicle can be opened without being caught on the carrier portion or at least opened to an extent to allow sufficient space to access the rear of the vehicle. In preferred embodiments of the rack 100 of the present invention, the carrier portion 120 can be adjusted from the upright position to the downward position, and vice-versa, without having to unload any bicycles or other items from the carrier portion.

The rack 100 has features that will be described in further detail below that supports the carrier portion 120 and retains the position of the carrier portion 120 when it is in the lowered position relative to the vehicle-coupling, without needing to unload any bicycles or other items from the carrier portion 120.

Figures 4, 5:
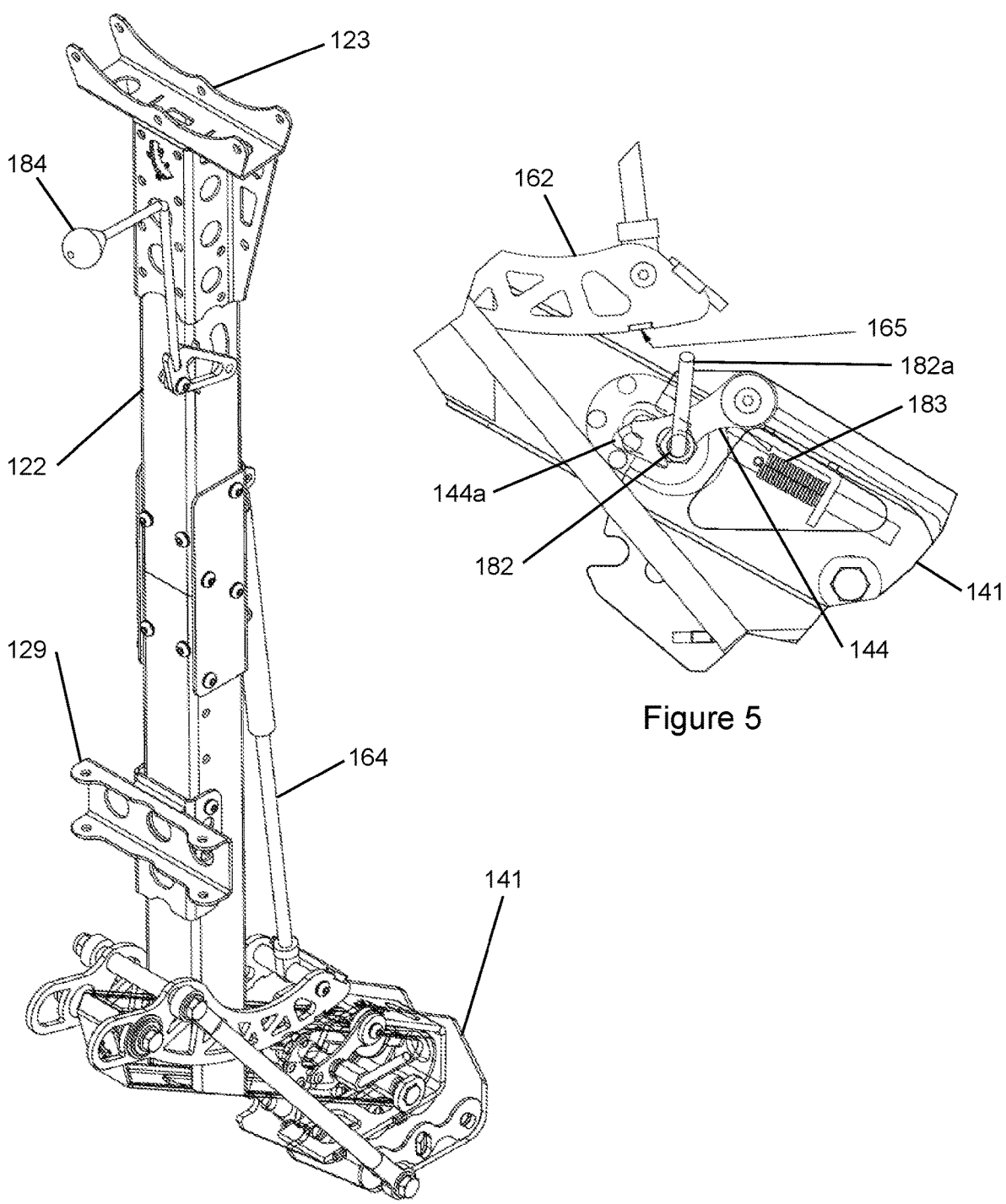
FIG. 4 shows an isometric view of the rack from FIG. 1.
FIG. 5 shows an enlarged side view of a portion of FIG. 3.

FIGS. 3 and 5 show a detailed view of the rack 100, in particular a view of the engagement of the carrier portion 120 with the vehicle-coupling portion 140. The rack 100 includes a linkage 160 and a locking mechanism 180.

The carrier portion 120 has an elongate support portion 122 on which a first mounting coupling portion 123 and a second mounting coupling portion 129 are located, each for receiving a respective mounting assembly. In turn, in one embodiment the mounting assemblies may be configured for receiving one of the wheels of a bicycle mounted on the carrier portion. In particular, the carrier portion has an upper mounting assembly on which a front wheel of a bicycle is mountable and a lower mounting assembly on which a rear wheel of a bicycle is mountable.

Each mounting assembly is an elongate body that is substantially transverse to the elongate support portion. In particular, an axis through the elongate support portion is substantially perpendicular to an axis through the elongate body of each mounting assembly. The upper and lower mounting assemblies are substantially parallel with each other.

In preferred embodiments, the first mounting coupling portion 123 and the second mounting coupling portion 129 are adjustable relative to the elongate support portion 122 and relative to each other. In this way, each of the upper and lower mounting portions can be raised or lowered depending on the dimensions of the bicycle(s) and/or other items(s) to be mounted on the carrier portion 120 and/or for the ease of convenience to the user (e.g. depending on the height of the user).

In addition, the upper and lower mounting portions can be adjusted to suit a height of the vehicle to which the carrier portion is coupled. In other embodiments, only one of the upper mounting portion and the lower mounting portion is adjustable relative to the elongate support portion. In yet further other embodiments, the upper mounting portion and the lower mounting portion are both fixed relative to the elongate support portion 122. In addition, each of the mounting assemblies may, in preferred embodiments, have a length that is adjustable depending on the number of bicycles or other items to be mounted on the carrier portion. The mounting assemblies will be described in further detail below.

Figure 14:
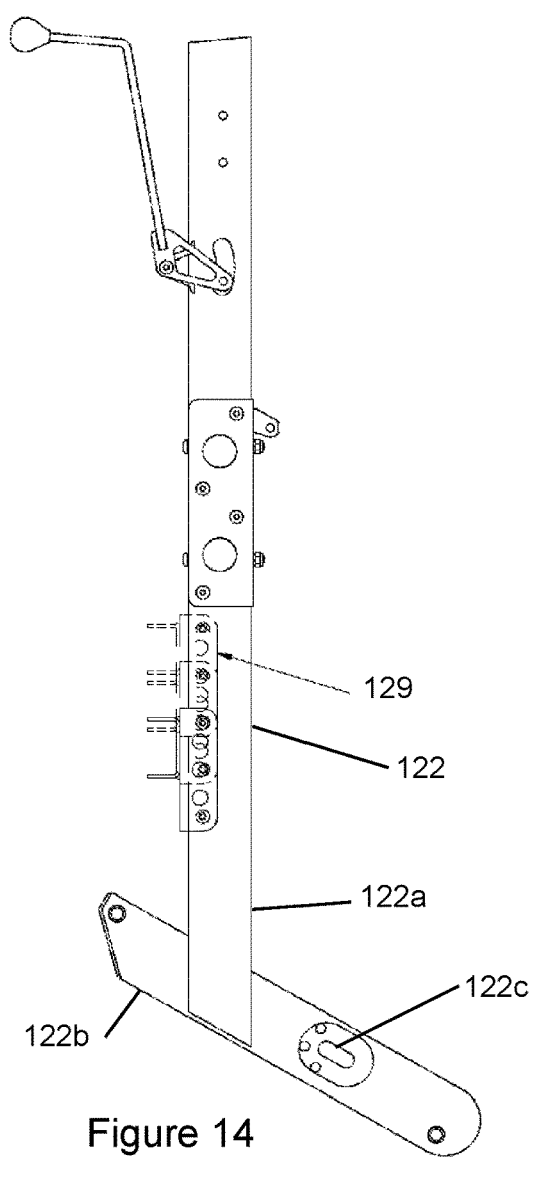
FIG. 14 shows a side view of the carrier portion from FIG. 11.

The elongate support portion 122 has a substantially hockey-stick shape, T-shape, or an asymmetric shape. In particular, in the example shown in FIG. 14, the elongate support portion 122 has an elongate body portion 122a and a foot portion 122b extending from an end of the elongate body portion 122a. The foot portion 122b is angled relative to the elongate body portion 122a. For example, the angle between the foot portion 122b and the elongate body portion 122a may be about 120°.

Referring now back to FIG. 3, the foot portion 122b is pivotably coupled to the vehicle-coupling portion 140. In particular, the foot portion 122b is pivotably coupled to the vehicle-coupling portion 140 about a forward portion of the foot portion 122b. When the carrier portion 120 is in the substantially upright position as shown, the elongate body portion 122a is substantially vertically upright. In this position, the elongate body portion 122a is substantially perpendicular to a ground surface.

By way of example, and as previously described, when in the substantially upright position, the carrier portion 120 may be at about 80° to 100° to the ground surface. Further preferably, when in the upright position, the carrier portion is tilted slightly forward towards the vehicle. When the carrier portion 120 is in the lowered position (as shown in FIG. 6), the elongate body portion 122a is tilted away from the vehicle such that the elongate body portion 122a is angularly offset from a normal axis to the ground surface.

The foot portion 122b has a slot 122c along which a locking portion 182 of the lock mechanism 180 is slidable to engage the vehicle-coupling portion to thereby retain a position of the carrier portion 120 relative to the vehicle-coupling portion 140.

The vehicle-coupling portion 140 includes a body portion 141, which includes a pair of spaced apart plates between which a forward portion of the foot portion 122*b* of the elongate support portion 122 described previously above is receivable. A pivot axis of the foot portion 122*b* of the elongate support portion 122 passes through the body portion 141, through the two plates. A fastener 146 pivotably couples the foot portion 122*b* to the vehicle-coupling portion 140. The pivot axis for the carrier portion 120 is coaxial to a longitudinal axis through the fastener 146.

The vehicle-coupling portion 140 has two vertically-spaced retaining portions 142 each for receiving a locking portion 182 of the locking mechanism 180 to retain a position of the carrier portion 120 relative to the vehicle-coupling portion 140. Each of the plurality of vertically-spaced retaining portions 142 defines a respective one of a plurality of mutually distinct locations for the carrier portion 120.

In particular, the vertically-spaced retaining portions 142 includes an upper retaining portion and a lower retaining portion. When the locking portion 182 engages the upper retaining portion, the carrier portion 120 is in the substantially upright position. When the locking portion 182 engages the lower retaining portion, the carrier portion 120 is in the lowered position. When the locking portion 182 does not engage any of the retaining portions 142, the carrier portion 120 can be pivoted relative to the vehicle-coupling portion 140.

Each retaining portion 142 is a slot in the body portion 141 in which the locking portion 182 is locatable and slidable. The slot has an opening leading into the slot from which the locking portion 182 is located in the slot or removed from the slot. The opening of the slot of the lower retaining portion is enlarged and is sloped to guide the locking portion upwardly as it moves outwardly from the lower retaining portion. The leading opening of the lower retaining portion allows the locking portion to automatically cam open and release the locking portion fully, ready for engagement with the slot of the upper retaining portion.

The slot extends along an axis that crosses the pivot axis about which the foot portion 122*b* of the elongate support portion 122 is pivotable. In particular, the axis along which the slot extends crosses that fastener 146 about which the foot portion is pivotable. In this way, there is a substantially smooth and uninterrupted linear motion of the locking portion 182 into a respective one of the slots when the locking portion 182 is aligned with the respective slot.

In the example shown, the vehicle-coupling portion 140 has two retaining portions 142. In other examples, the vehicle-coupling portion has more than two retaining portions that are vertically spaced. For example, the vehicle-coupling portion may include three vertically-spaced retaining portions, four vertically-spaced retaining portions, or more than four vertically spaced retaining portions. In yet other examples, some or all of the retaining portions may be holes instead of slots as shown. Each one of the plurality of retaining portions defines a respective one of a plurality of positions of the carrier portion 120 relative to the vehicle-coupling portion 140.

The vehicle-coupling portion 140 further includes a tow bar-coupling portion 143 for engaging a tow bar of the vehicle to thereby couple the vehicle-coupling 140 to the vehicle. The tow bar-coupling portion is attached to the vehicle to resist lateral and vertical movements of the rack relative to the vehicle.

The vehicle-coupling portion 140 further includes a trapping portion 144 that is adjustable relative to the body portion 141 to trap the locking portion 182 in the upper retaining portion 142. The trapping portion 144 has a hook shape with a substantially enlarged head 144*a*.

When the carrier portion 120 is in the upright position and the vehicle is in motion, the trapping portion 144 ensures the locking portion 182 remains in the upper retaining portion 142 and the carrier portion 120 would not accidentally drop to a lowered position. In other examples, the trapping portion may be for trapping the locking portion in the lower retaining portion instead of, or in addition to, being able to trap the locking portion in the upper retaining portion.

The trapping portion 144 is preferably adjustable to restrict the opening into the slot of the retaining portion 142. In particular, the trapping portion 144 is pivotable about the body portion. The trapping portion 144 is pivotable from a first position in which access of the locking portion into or from the retaining portion is restricted (e.g. the locking portion is trapped in the retaining portion if the locking is already located in the retaining portion, or the locking portion is prevented from entering the retaining portion if the locking portion is not already located in the retaining portion) and a second position in which access of the locking portion into or from the retaining portion is allowed (e.g. the locking portion 182 can be entered into or removed from the upper retaining portion 142).

The trapping portion 144 is pivotable between the first position and the second position. The trapping portion 144 can be normally biased toward the first position. In the example shown, the trapping portion 144 is biased towards the first position by keeping the trapping portion 144, when not in the first position, substantially rearward of a pivot axis about which the trapping portion 144 is pivotable so that the trapping portion 144 would return to the first position by gravity.

In this embodiment, the trapping portion 144 is couplable with a forward portion 168 of the linkage 160 when the carrier portion 120 is in the substantially upright position, as the trapping portion is magnetically attachable to the forward portion 168. The attraction force between the trapping portion 144 and the forward portion 168 is less than the downward force acting on the carrier portion by way of gravity such that when the locking portion of the locking mechanism 180 clears the upper retaining portion, the carrier portion would drop to the lowered position thereby decoupling the trapping portion 144 from the forward portion 168.

According to this embodiment, a range of preferred motion of the trapping portion is limited such that the trapping portion would automatically move into position to cover the opening leading to the upper retaining portion without requiring the user to manually reposition the trapping portion. In particular, the range of motion allowed for the trapping portion is rearward of the pivot axis of the trapping portion.

The enlarged head 144*a* of the trapping portion 144 protrudes from the body portion 141 of the vehicle-coupling portion 140 when the trapping portion is in the first position. When the locking portion 182 is moved from the lowered retaining portion 142 towards the upper retaining portion 142, the locking portion would contact a portion of the enlarged head 144*a* of the trapping portion that protrudes from the body portion 141 to raise the trapping portion 144 away from the first position thereby exposing an entry into the upper retaining portion 142 for insertion of the locking portion 182. As the locking portion 182 is inserted into the upper retaining portion 142, the locking portion 182 would clear the enlarged head 144*a* of the trapping portion 144 and the trapping portion 144 would drop to the first position to trap the locking portion 182 in the upper retaining portion 142.

The locking portion 182 is moved out of the lower retaining portion by actuating the lever 184, which is hand operated but may be foot operated in an alternative embodiment. In this regard, the locking portion 182 is normally biased into engagement with a respective one of the retaining portions 142. Because the locking portion 182 is removed, or at least mostly removed, from engagement with the lower retaining portion 142, the carrier portion can be pivoted upwards towards the substantially upright position.

The linkage 160 (or linkage mechanism) is configured to bias the carrier portion 120 to a substantially upright position relative to the vehicle-coupling portion 140 when the vehicle-coupling portion 140 is coupled to the vehicle, and to support the carrier portion 120 relative to the vehicle-coupling portion 140 when the carrier portion 120 is in the lowered position and loaded with one or more bicycles or other items.

The linkage 160 includes a link portion 162 pivotably coupled to the foot portion 122*b* of the elongate support portion 122. In particular, a rearward region of the link portion 162 is pivotably coupled to the foot portion 122*b* about a pivot 163 at or near a rearward end of the foot portion 122*b*.

The linkage 160 includes a biasing mechanism (or biasing component) 164 for biasing the carrier portion 120 to the substantially upright position. A forward portion 168 of the link portion 162 is pivotably coupled to the biasing mechanism 164. An opposite end of the biasing mechanism 164 is coupled to the carrier portion 120. The biasing mechanism 164 in a preferred embodiment may be a gas spring, a traction spring or a gas strut.

The biasing mechanism further includes a damper for damping or slowing down a movement of the carrier portion 120 towards the substantially upright position and towards the lowered position. Thereby, when the carrier portion 120 is adjusted from the lowered position to the substantially upright position, the carrier portion 120 would not accelerate towards and overshoot the upright position into the rear of the vehicle, particularly when the carrier portion 120 is not loaded with any bicycles or other items. Similarly, when the carrier portion 120 is adjusted from the substantially upright position to the lowered position, the carrier would not drop quickly which would otherwise risk damaging the coupling between the carrier portion and the vehicle-coupling portion particularly when the carrier portion is loaded.

The elongate body portion 122*a* is positioned intermediate of the rearward end and forward end of the link portion 162. In other examples, the biasing means may be a leaf spring, coil spring, torsion bar spring, a compression spring, or a tension spring. The biasing means may be made from steel for example. In yet other examples, the linkage may include a motorized linear actuator instead of, or in addition to, the biasing mechanism previously described for raising and lowering the carrier portion relative to the vehicle-coupling portion. The motorized linear actuator may be powered using a battery of the vehicle. In other examples, the actuator may be powered by a cordless drill or other cordless tools. The motorized linear actuator may be controlled via a user's smartphone or mobile device. In still further other examples, the linkage may include a hydraulic ram. In still further other examples, the linkage may include a hand winch or a pulley system with a cable that is actuatable to raise or lower the carrier portion.

The linkage 160 further includes an elongate rigid component 166, which may be an elongate bar for example, which connects the link portion 162 to the vehicle-coupling portion 140. The elongate rigid component 166 creates the leverage for the biasing mechanism 164 to assist with lifting the carrier portion 120 from the lowered position to the substantially upright position.

A forward end of the elongate rigid component 166 is connected to the vehicle-coupling portion 140, in particular the body portion 141 of the vehicle-coupling portion 140. A rearward end of the elongate rigid component 166 is connected to the link portion 162 near the pivot 163 about which the link portion 162 is pivotable. With the link portion 162, the elongate rigid component 166 provides additional support when the carrier portion 120 is adjusted to the lowered position.

The bike carrier includes the locking mechanism 180 for locking a position of the carrier portion 120 relative to the coupling portion 140. The locking mechanism 180 is in particular adjustable in unison with the carrier portion 120 as it is adjusted between the substantially upright position and the lowered position and is engageable with the vehicle-coupling portion 140 to secure the carrier portion 120 relative to the vehicle-coupling portion 140.

The locking mechanism 180 includes the locking portion 182 described previously above, which is slidable in a slot 122*c* in the foot portion 122*b* of the elongate support portion 120. In other examples, the locking mechanism may include a plurality of locking portions, each locking portion for engaging a respective one of the retaining portions previously described.

The slot 122*c* along which the locking portion 182 is slidable is provided near a forward end of the foot portion 122*b*. The locking portion 182 is securable to the vehicle-coupling portion 140. In particular, the locking portion 182 includes a fastener with an elongate body that is locatable through the retaining portion 140 and a nut into which the fastener can be removably fastened to securely locate the locking portion 182 in the retaining portion. The locking portion 182 can be unfastened from the nut to allow the locking portion 182 to be displaced from the retaining portion 140.

For example, once the locking portion is located in a respective one of the vertically-spaced retaining portions, the locking member can be configured to a locked position to prevent removal of the locking portion from the respective vertically-spaced retaining portion and can be configured to an unlocked position to allow removal of the locking portion from the respective vertically-spaced retaining portion.

The nut with which the fastener is engageable has an elongate nut-handle portion 182*a* for ease of operation to fasten the nut onto the fastener or to unfasten the nut from the fastener. The nut-handle portion 182*a* may be welded or integrally formed with the nut. The nut-handle portion 182*a* prevents the nut from vibrating to loosen the nut from the fastener due to gravity preventing the handle from fully turning.

The locking mechanism 180 further includes a handle portion 184 that is located on the elongate support portion 122. The handle portion 184 may be manipulated by a user's hand, or alternatively by a user's foot depending on the particular location of the handle portion 184.

The handle portion 184 is coupled to the locking portion 182 and is operable to adjust the position of the locking portion within the slot 122*c*. Thereby, when the locking portion 182 is located in a retaining portion 142 of the vehicle-coupling 140, the user can disengage the locking portion 182 from the retaining portion 142 by manipulating the handle portion 184.

The locking portion 182 is biased towards the vehicle-coupling portion 140. In particular, when the locking portion 182 is aligned with any one of the retaining portions 142, the locking portion 182 will automatically move towards the retaining portion for engagement therewith to secure the carrier portion 120 relative to the vehicle-coupling portion 140. The locking portion 182 is biased towards the vehicle-coupling portion and into engagement with a respective one of the retaining portions.

Figures 10, 11:
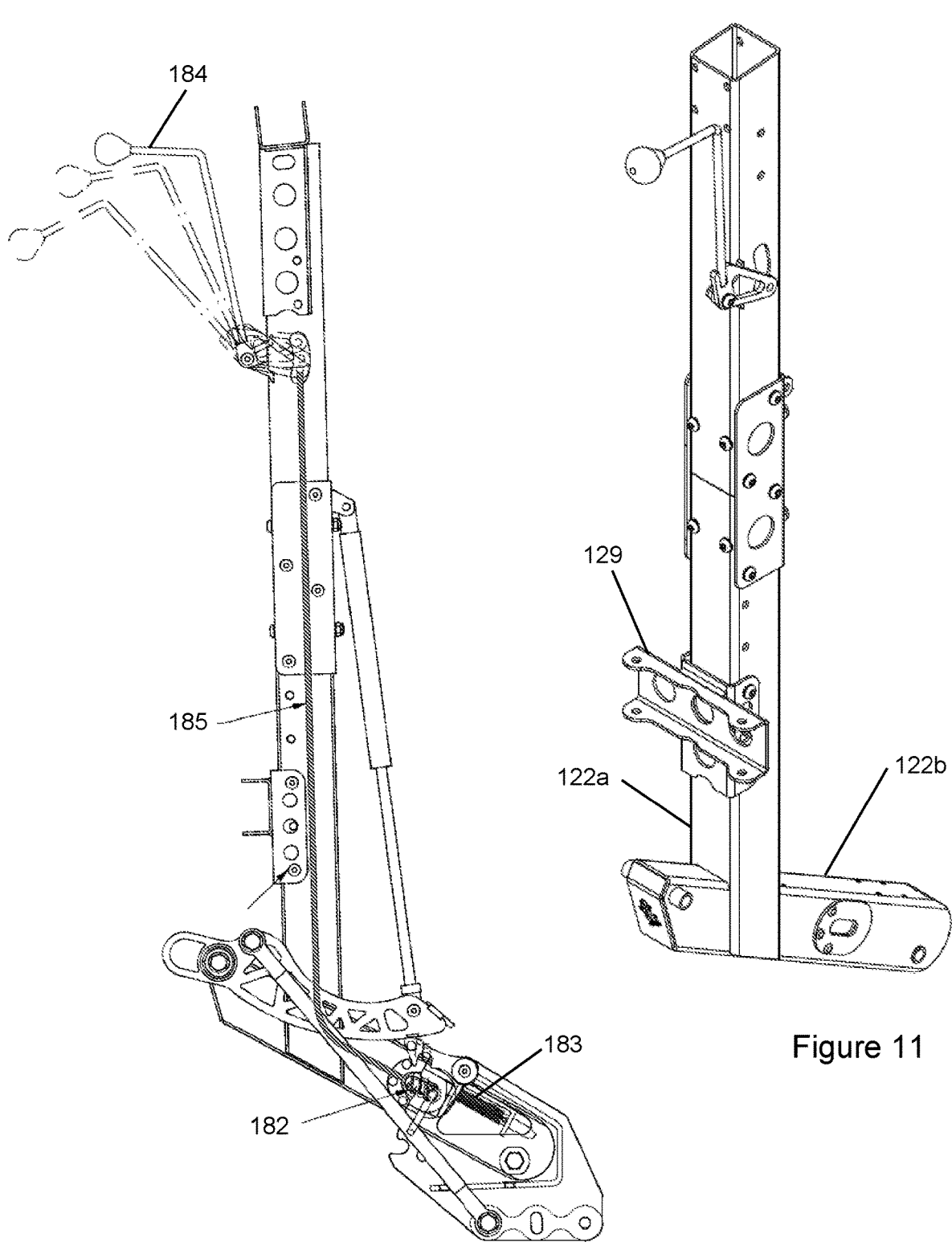
FIG. 10 shows a side view of the rack from FIG. 1, with an internal cable location shown for illustrative purposes.
FIG. 11 shows an isometric view of the carrier portion of the rack from FIG. 1.
Figure 12:
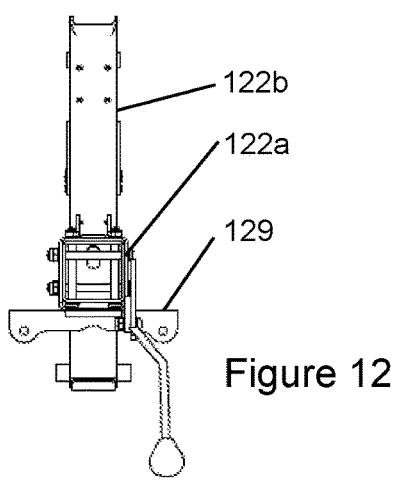
FIG. 12 shows a top view of the carrier portion from FIG. 11.
Figure 13:
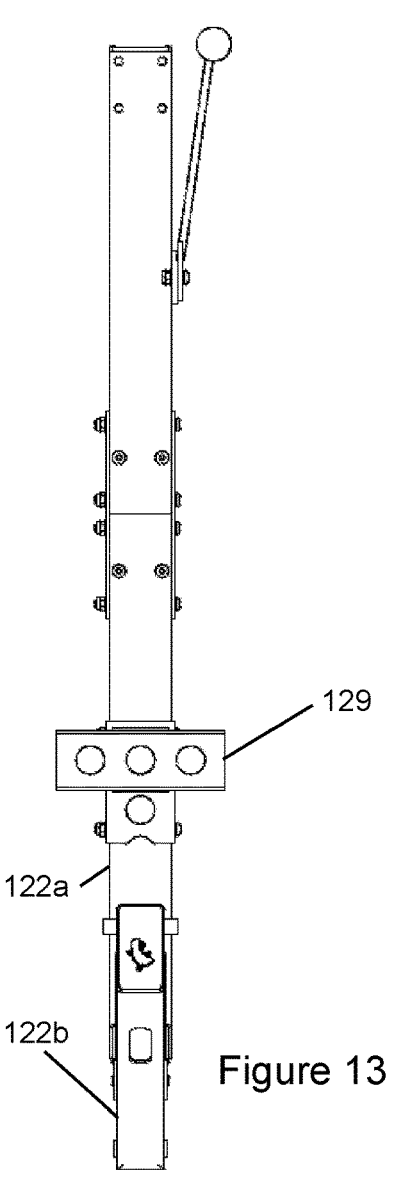
FIG. 13 shows a rear view of the carrier portion from FIG. 11.

By way of example, FIG. 10 shows the locking portion 182 is biased by a spring 183 to draw the locking portion 182 into engagement with a respective one of the retaining portions. Meanwhile, an internal cable 185 connects the handle 184 with the locking portion 182, thereby allowing the handle 184 to move the locking portion 182 against the bias of the spring 183.

There are four levels of safety or redundancy built into the rack to ensure that the carrier portion does not drop when it is the substantially upright position. Firstly, the locking portion 182 automatically engages the upper retaining portion 142 due to the biasing spring 183 acting on the locking portion 182. Secondly, the trapping portion 144 traps the locking portion 182 in the upper retaining portion 142 to prevent the locking portion 182 from coming out therefrom. Thirdly, the locking portion 182 is fastened (by fastening the nut using the nut-handle portion 182*a* onto the fastener of the locking portion) which clamps the whole pivot assembly tight. Fourthly, the nut-handle portion 182*a* substantially resists any vibration caused when the vehicle in in motion that would otherwise cause the nut to become loose.

FIGS. 6, 9, and 10 illustrate movement of the carrier portion 120 from the substantially upright position to the lowered position. The locking portion 182 of the locking mechanism is initially trapped by the trapping portion 144 in the upper retaining portion. In this arrangement, the carrier portion 120 is in the substantially upright position.

To adjust the carrier portion 120 to the lowered position, the trapping portion 144 is lifted to magnetically engage the forward portion of the linkage 160. In this process, the trapping portion 144 is rotated upwardly from the locking portion 182 until it contacts the link portion 162. A magnet 165 is attached to or embedded in the link portion 162, which holds the trapping portion 144 in the raised position.

In other embodiments, the pivot range of the trapping portion 144 may be limited or the magnet not provided such that the trapping portion 144 at any location in the pivot range would always return to a single rest position to cover the opening of the upper retaining portion 142. Thereby, in these other embodiments, there is no risk of the user forgetting to flip the trapping portion 144 back towards the upper retaining portion to trap the locking portion 182 therein.

In the configuration shown in solid lines in FIG. 10, the locking portion 182 is located in the upper retaining portion 142 such that the carrier portion 120 is in a substantially upright position with the trapping portion 144 flipped upwardly about its pivot axis. When the carrier portion 120 is desired to be adjusted to the lowered position, the locking portion 182 is unfastened from the vehicle-coupling portion 140 and, as shown in broken lines, the handle portion 184 is manipulated by the user to retract the locking portion 182 along the slot 126 from the upper retaining portion 142.

With the locking portion 182 displaced from the upper retaining portion 142, the carrier portion 120 can be pivoted freely relative to the vehicle-coupling portion 140. The carrier portion 120 is pivoted downwards, as shown in broken lines in FIG. 6, such that the locking portion would be aligned with the lower retaining portion 142. As a result of the carrier portion 120 being lowered, the trapping portion 144 would fall to cover the opening to the upper retaining portion.

The handle portion 184 can now be released, which would return the locking portion 182 towards the vehicle-coupling portion 140 and into engagement with the lower retaining portion 142. The locking portion 182 is subsequently fastened to secure the locking portion 182 in the lower retaining portion 142. Alternatively, the handle portion 184 could have been released earlier, which would result in the locking portion 182 automatically engaging the lower retaining portion 142 as soon as the carrier portion 120 reached the lowered position, due to the biasing acting on the locking portion 182.

To reposition the carrier portion 120 in the substantially upright position form the lowered position, the locking portion is unfastened (if it was previously fastened) and the handle portion 184 is manipulated by the user's hand to retract the locking portion 182 away from the lower retaining portion 142. The carrier portion 120 can then be pivoted upwards to assume the substantially upright position.

Previously, movement of the carrier portion 120 to the lowered position will have moved the link portion 162 upwardly, causing the trapping portion to be released and rotate downwardly under gravity. Now, as the carrier portion is positioned to the substantially upright position, the locking portion 182 becomes in contact with the enlarged head portion 144*a* of the trapping portion 144, which is in the first position covering the opening into the upper retaining portion 124.

As the locking portion 182 is moved further upwards as the carrier portion 120 is pivoted upwards, the locking portion 182 displaces the trapping portion 144 upwardly away from the upper retaining portion 142. This allows for entry of the locking portion 182 into the upper retaining portion 142 when it is aligned with the upper retaining portion 142. Once aligned, the locking portion slides into the upper retaining portion 142 and the locking portion can subsequently be fastened to secure the locking portion in the vehicle-coupling portion 140. In addition, when the locking portion 182 slides into the upper retaining portion 142, it would clear the trapping portion 144 causing the trapping portion 144 to return to the first position to trap the locking portion 182 within the upper retaining portion 142.

FIGS. 15 to 29 show an upper mounting portion 121 for the carrier portion 120 of the rack 100 connected to the first mounting coupling portion 123. A front wheel 200*a* of a bicycle to be mounted to the carrier portion 120 is locatable on the upper mounting portion 121. The upper mounting portion 121 has a plurality of spaced apart hoop portions 125 (or wheel-receiving portions) thereon each for receiving a front wheel of a respective one of the bicycles to be mounted to the carrier portion 120.

When a front wheel 200*a* is located in a respective one of the hoop portions 125, the front wheel 200*a* would be retained in a generally vertically tilted position and prevented from any sideward movements. By locating the tyres in a vertically tilted position, bikes can be closely nested such that handlebars of adjacent bikes do not clash with each other.

The upper mounting portion 121 has a main elongate body portion 121*a* that is coupled to the elongate support portion 122 by the first mounting coupling portion 123. The upper mounting portion 121 extends transversely to the elongate support portion 122. In particular, the upper mounting portion 121 extends substantially along a horizontal axis, while the elongate support portion 122 extends substantially along a vertical axis.

The first mounting coupling portion 123 allows for the upper mounting portion 121 to be adjusted relative to the elongate support portion 122. In particular, the upper mounting coupling portion 123 has a first portion that is coupled to a portion of the main elongate body portion 121*a* and a second portion that is coupled to the elongate support portion 122. The upper mounting portion may be made from aluminium.

The first portion of the upper mounting coupling portion 123 may be adjustable along a length of the main elongate body portion 121*a*. In a preferred example, the main elongate body portion 121*a* has a series of apertures along a length thereof. The first portion of the upper mounting coupling portion 123 has one or more apertures that are alignable with one or more apertures of the plurality of apertures in the main elongate body portion 121*a*. A fastener is passable in the aligned apertures to secure the main elongate body portion 121*a* relative to the upper mounting coupling portion 123. In other examples, the upper mounting portion may be fixed or an integral part of the upper mounting coupling portion.

The second portion of the upper mounting coupling portion 123 may be adjustable relative to the elongate support portion 122 to adjust a height of the upper mounting portion 121 relative to the elongate support portion 122. In a preferred example, the elongate support portion 122 has a plurality of apertures, which includes a first set of apertures along a length of the elongate support portion 122 and a second set of apertures along the length of the elongate support portion 122, which is spaced laterally apart from the first set of apertures. The second portion of the upper mounting coupling portion 123 has one or more apertures that are alignable with one or more apertures of the plurality of apertures on the elongate support portion 122. A fastener is passable in the aligned apertures to secure the upper mounting coupling portion 123 to the elongate support portion 122. In other examples, the upper mounting portion may be slidable relative to the elongate support portion to adjust a height of the upper mounting portion.

The upper mounting portion 121 has a length that is adjustable depending on the number of bicycles to be mounted to the upper mounting portion 121. In the preferred example, the main elongate body portion 121*a* has four hoop portions spaced apart along a length thereof for receiving front wheels of four bicycles. In other examples, the main elongate body portion may have less than four hoop portions or more than four hoop portions.

Figures 34, 35:
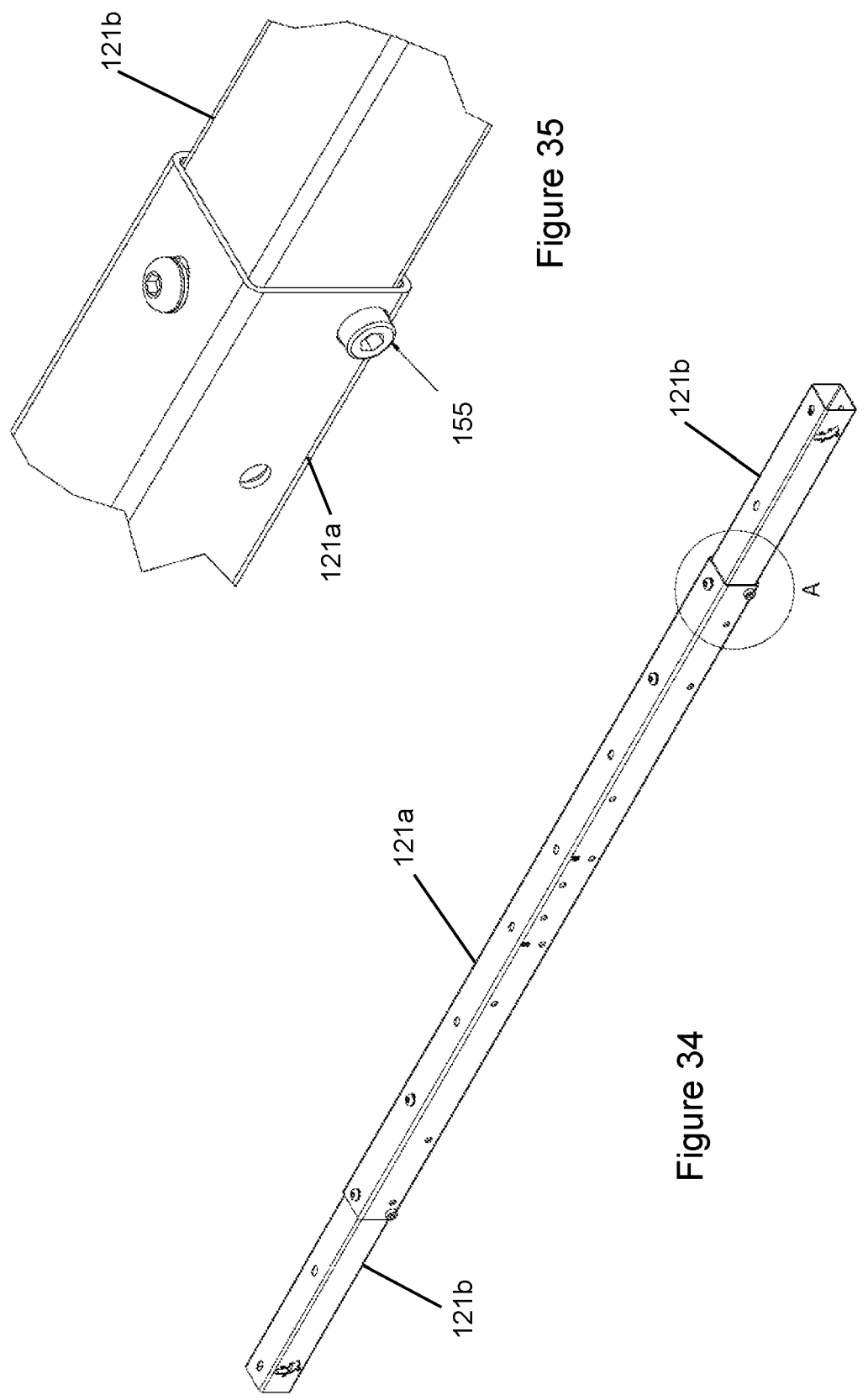
FIG. 34 shows the upper mounting portion configured for use with six bikes.
FIG. 35 shows an enlarged portion of FIG. 34 illustrating the extension of the upper mounting portion.
Figures 36, 37, 38, 39:
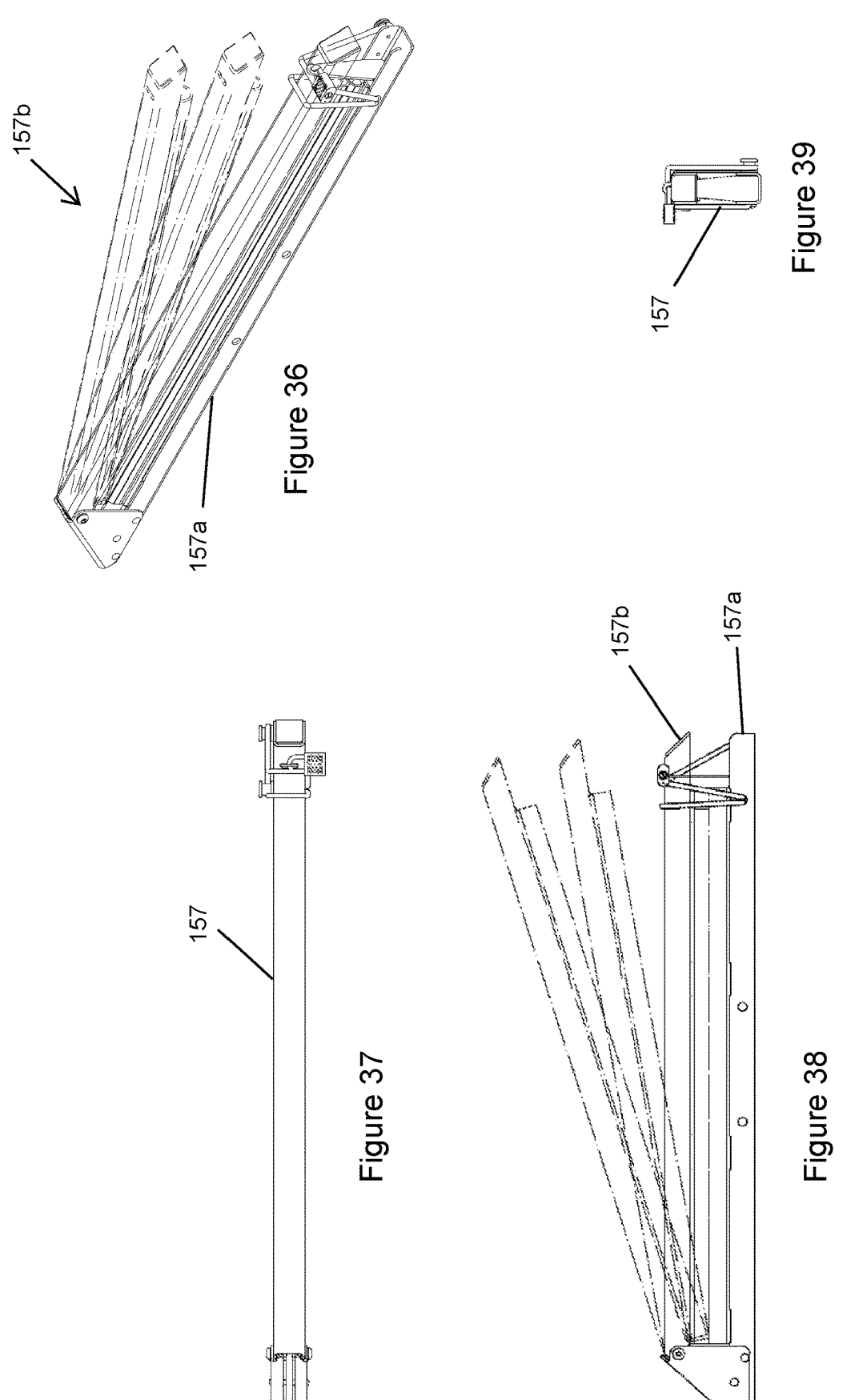
FIG. 36 shows an isometric view of a snow equipment securing portion.
FIG. 37 shows a front view of the snow equipment securing portion from FIG. 36.
FIG. 38 shows a side view of the snow equipment securing portion from FIG. 36.
FIG. 39 shows a top view of the snow equipment securing portion from FIG. 36.

As shown in FIGS. 34 and 35, the upper mounting portion 121 includes one or more elongate extension portions 121*b* that are coupleable to the main elongate body portion 121*a*. The or each elongate extension portion 121*b* has one or more attachment locations for hoop portions to be connected, each for receiving a front when of one or more additional bicycles.

In the preferred embodiment shown, the first elongate extension portion 121*b* is coupled to one end of the main elongate body portion 121*a* and a second elongate extension portion 121*b* is coupled to another end of the main elongate body portion 121*a*. The elongate extension portion 121*b* may be removably attachable to the main elongate body portion 121*a*. For example, the elongate extension portion 121*b* can be fastened to the main elongate body portion 121*a* using a bolt 155. In the embodiment shown, the head of the bolt 155 fits through a clearance hole in one side of 121*a* and seats on the internal portion, which clamps it hard against one internal side of 121*a*. This is a simple but effective method of eliminating relative movement between the components. In other examples, the elongate extension portion may be slidable relative to the main elongate body portion. For example, the elongate extension portion may be telescopic relative to the main elongate body portion The hoop portion 125 for receiving a front wheel of a bicycle includes a cord portion 125*a* for securing the wheel to the hoop portion and a pair of spaced apart bracket portions (or mounting portions or base portions) 125*b*, each on respective opposite sides of the hoop portion 125, for mounting the hoop portion 125 to the upper mounting portion 121. The cord portion 125*a* may be a bungee cord or a shock cord for example. In other examples, the cord portion may be replaced with a rope portion, cable portion, or strap portion. For example, the cord portion may be replaced with a stretch lock strap or a cam buckle.

Figures 21, 22, 23, 24, 25:
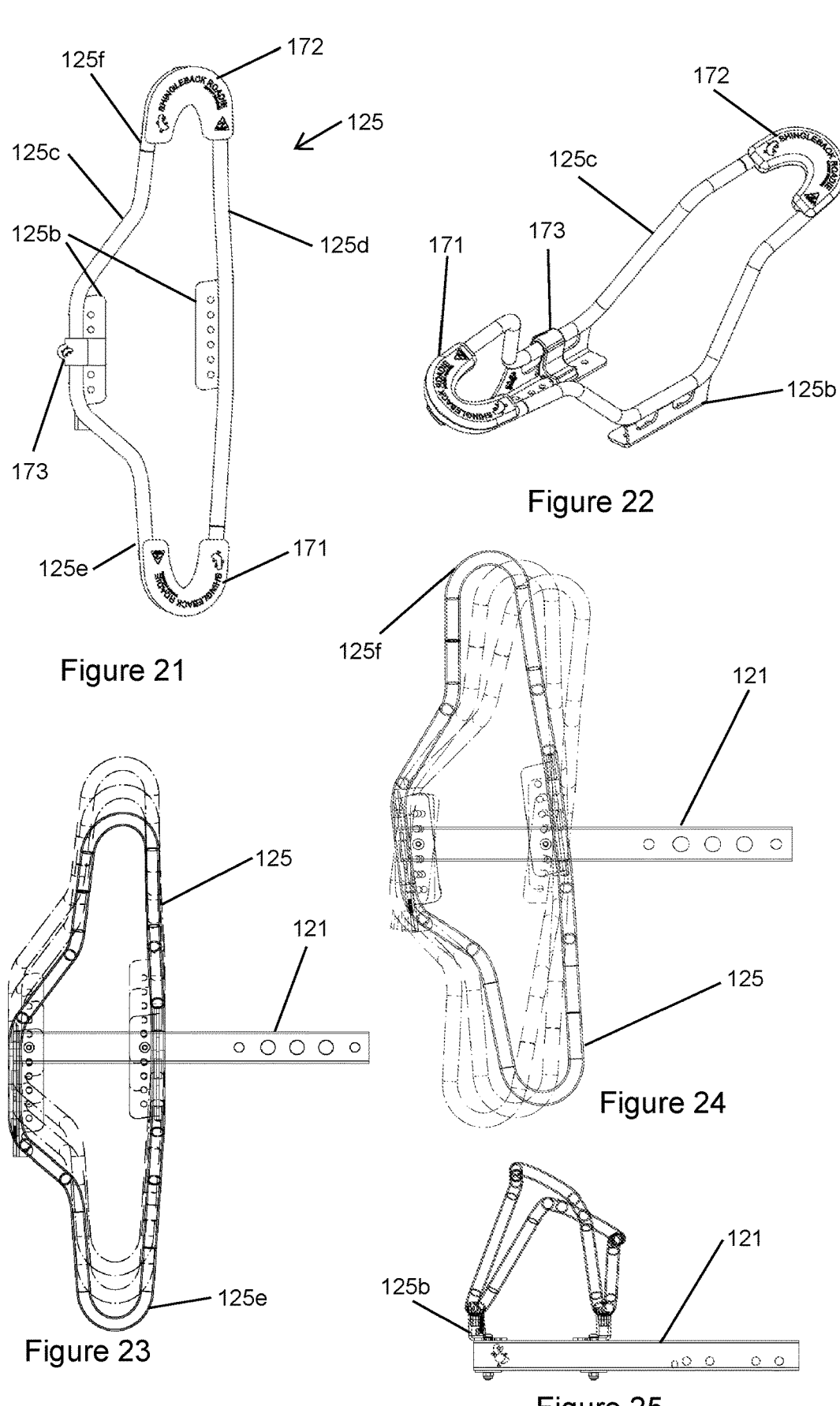
FIG. 21 shows a top view of a hoop portion for receiving a front wheel of a bike, with road bike inserts fitted.
FIG. 22 shows an isometric view of the hoop portion from FIG. 21.
FIG. 23 shows a top view of the hoop portion from FIG. 21 with the road bike inserts removed and the hoop portion connected to an upper mounting portion, with broken lines illustrating translational adjustment options for the hoop portion relative to the upper mounting portion.
FIG. 24 shows a top view of the arrangement from FIG. 23, with broken lines illustrating rotational adjustment options for the hoop portion relative to the upper mounting portion.
FIG. 25 shows a side view of the arrangement from FIGS. 23 and 24.

The hoop portion 125 is adjustable relative to the upper mounting portion 121 to which it is mounted. In particular, the hoop portion 125 can be adjusted rearwardly or forwardly relative to the upper mounting portion 121, as shown in FIG. 23. The bracket portion 125*b* has a series of apertures along a length of thereof that are alignable with apertures in the upper mounting portion 121 to adjust the position of the hoop portion rearwardly or forwardly relative to the upper mounting portion 121.

The bracket portions 125*b* may be angled relative to the upper mounting portion 121 such that the hoop portion 125 when mounted to the upper mounting portion 121 is not perpendicular to the upper mounting portion. The hoop portion may for example be about 30° to 60° to the upper mounting portion. Preferably, this angle is adjustable as shown in FIG. 24.

Figure 40:
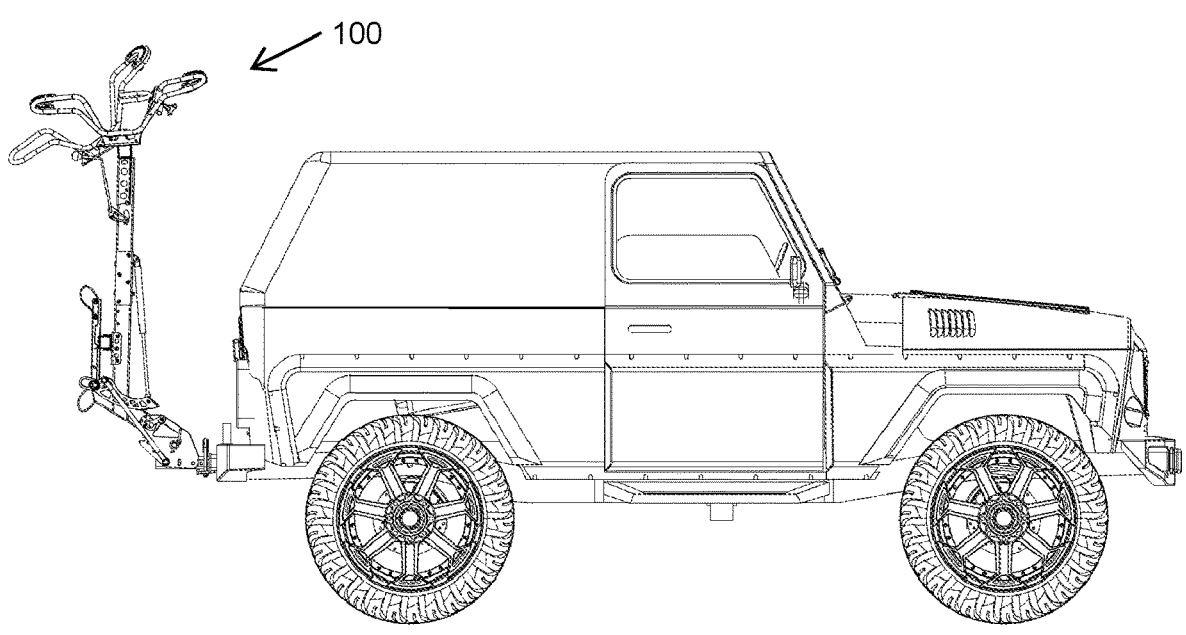
FIG. 40 shows a side view of a vehicle with the rack.
Figure 41:
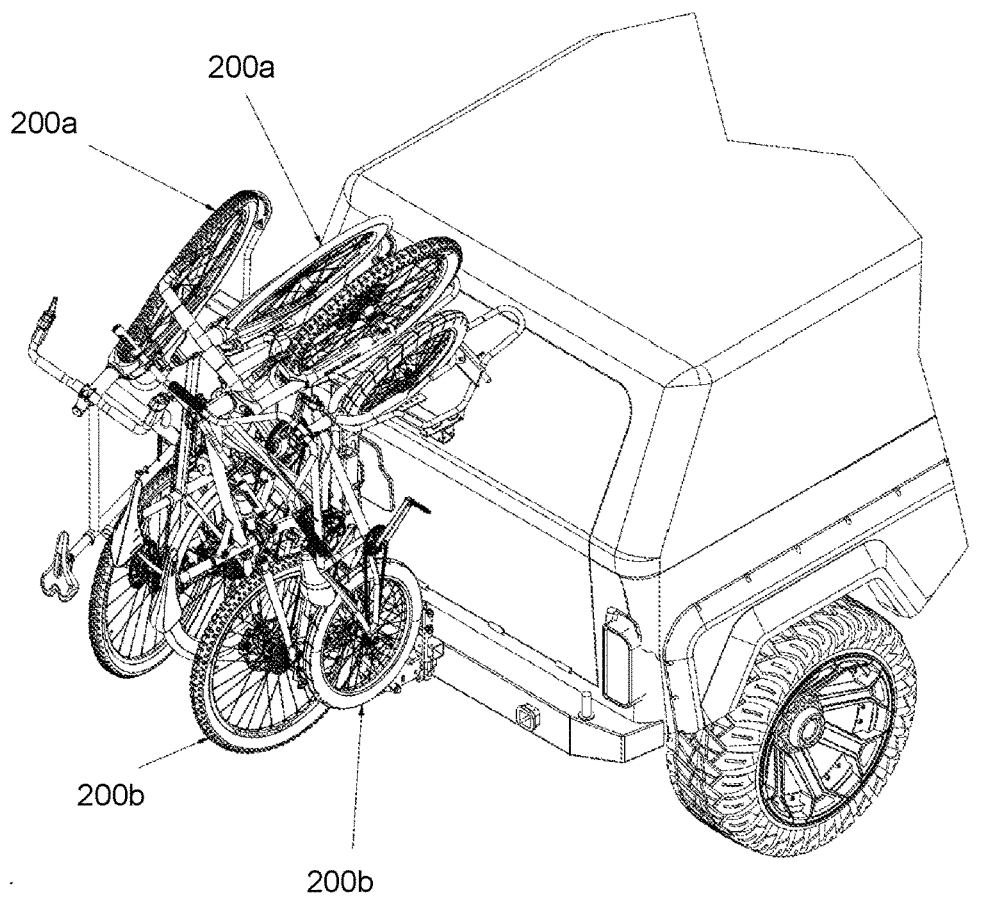
FIG. 41 shows an angled upper rear view of the vehicle and rack with bikes of a range of styles and sizes fitted.

Optionally, an additional road bike angle bracket may be used to connect the bracket portion 125*b* to the upper mounting portion 121, to alter the angle of the hoop portion 125. This additional bracket may sometimes be needed to allow all road or gravel bikes to be loaded, as without tilting every second bike down the handlebars may clash. These brackets angle the hoop portion 125 down at about a 30° angle, as is shown in the left most bike position of FIGS. 40 and 41, for example.

A fastener is passable through the vertically-aligned apertures to secure the hoop portion 125 relative to the upper mounting portion 121. In other examples, the hoop portion may be slidable rearwardly or forwardly relative to the upper mounting portion. The adjustment of the hoop portion(s) relative to the mounting portion allows for more clearance between adjacent bicycles. In yet further examples, the hoop portion may be pivotable or rotatable relative to the upper mounting portion.

With reference to FIG. 21, the hoop portion 125 is defined by a first side portion 125*c* and a second side portion 125*d* spaced apart from each other for receiving the wheel therebetween. Each of the first and second side portions 125*c*, 125*d* extend from a respective one of the first and the second bracket portions (or base portions) 125*b*. In particular, each of the first and second side portions 125*c*, 125*d* has a respective bracket portion 125*b* substantially located at or near a mid-length of the respective first and second side portions 125*c*, 125*d* and each respective side portion have a substantially V-shape or U-shape profile extending from the bracket portion 125*b*, with the bracket portion 125*b* being at the lowermost region of the side portion 125*c*, 125*d*.

The cord portion 125*a* for securing the wheel of the bicycle to the upper mounting portion 121 is at or near the bracket portion of the first side portion 125*c* to pull the wheel toward the bracket portion 125*b* of the first side portion 125*c*. Each of the first and second side portions may be angled inwardly from the respective bracket portions towards each other. Alternatively, at least the second side portion is angled while the first side portion is substantially upright.

The hoop portion is further defined by a front portion 125*e* and a rear portion 125*f*. The first side portion 125*c*, the second side portion 125*d*, the front portion 125*e*, and the rear portion 125*f* form a loop in which the wheel of the bicycle is trappable. The front portion 125*e* connects an end of the first side portion 125*c* and an end of the second side portion 125*d*. The rear portion 125*f* connects another end of the first side portion 125*c* and another end of the second side portion 125*d*.

The first side portion 125*c* and the second side portion 125*d* are tapered towards each other, or diverges inwardly towards each other, at or near the respective front portion 125*e* and rear portion 125*f* of the hoop portion. This tapering of the first and second side portions 125*c*, 125*d* create a clamping or wedging effect on the edges of the tyre that is received by the hoop portion while creating a space between sides of the tyre and the side portions 125*c*, 125*d* of the hoop portion 125.

In addition, the tapering of the first and second side portions allow for wheels of varying widths to be located in the hoop portion while still being able to provide a clamping force on the edges of the tyre. However, in instances where bikes with particularly narrow tyres are used, such as road bikes, optional inserts may be used to provide a narrower tapered section. As shown in FIGS. 21 and 22, a first road bike insert 171 is fitted to the front portion 125*e*, a second road bike insert 172 is fitted to the rear portion 12*f*, and a third road bike insert 173 is fitted to the first side portion 125 proximal the bracket portion 125*b*. These inserts can be easily removed when not required, such as is shown in FIGS. 23 and 24.

An axis along which the front and rear portions extend is substantially parallel to a rotation axis of the wheel received therebetween. An axis along which the front and rear portions 125*e*, 125*f* is an angle of up to about 60° to an axis through the bracket portions 125*b* of the hoop portion 125. In other examples, the angle may be up to about 40°, up to about 30°, or up to about 20°.

When the wheel is located in the hoop portion and is in the rest portion, the wheel has minimal contact with the hoop portion. In particular, when the wheel is received in the hoop portion 125, and the wheel is in the rest position, the only contact between the hoop portion on the wheel would be on the edges of the wheel tread and, in some instances depending on the width of the tyre, on the tread portion of the tyre. There would be a spacing between the bike tyre sidewall and the second side portion 125*d* at a lower region of the hoop portion, near the bracket portions 125*b* such that the sides of the tyre do not rub against the hoop portion when the wheel is in the rest position in the hoop portion.

A first angle between the wheel in the rest position when located in the hoop portion 125 and the upper mounting portion 121 on which the wheel is mounted is non-parallel with a second angle between each of the first side portion 125*c* and the second side portion 125*d* and the upper mounting portion 121. In particular, the first angle of the wheel in the rest position is less than the second angle of the first side portion 125*c* and the second side portion 125*d* by at least about 5°, or at least about 10°, or at least about 20°.

Figures 30, 31, 32, 33:
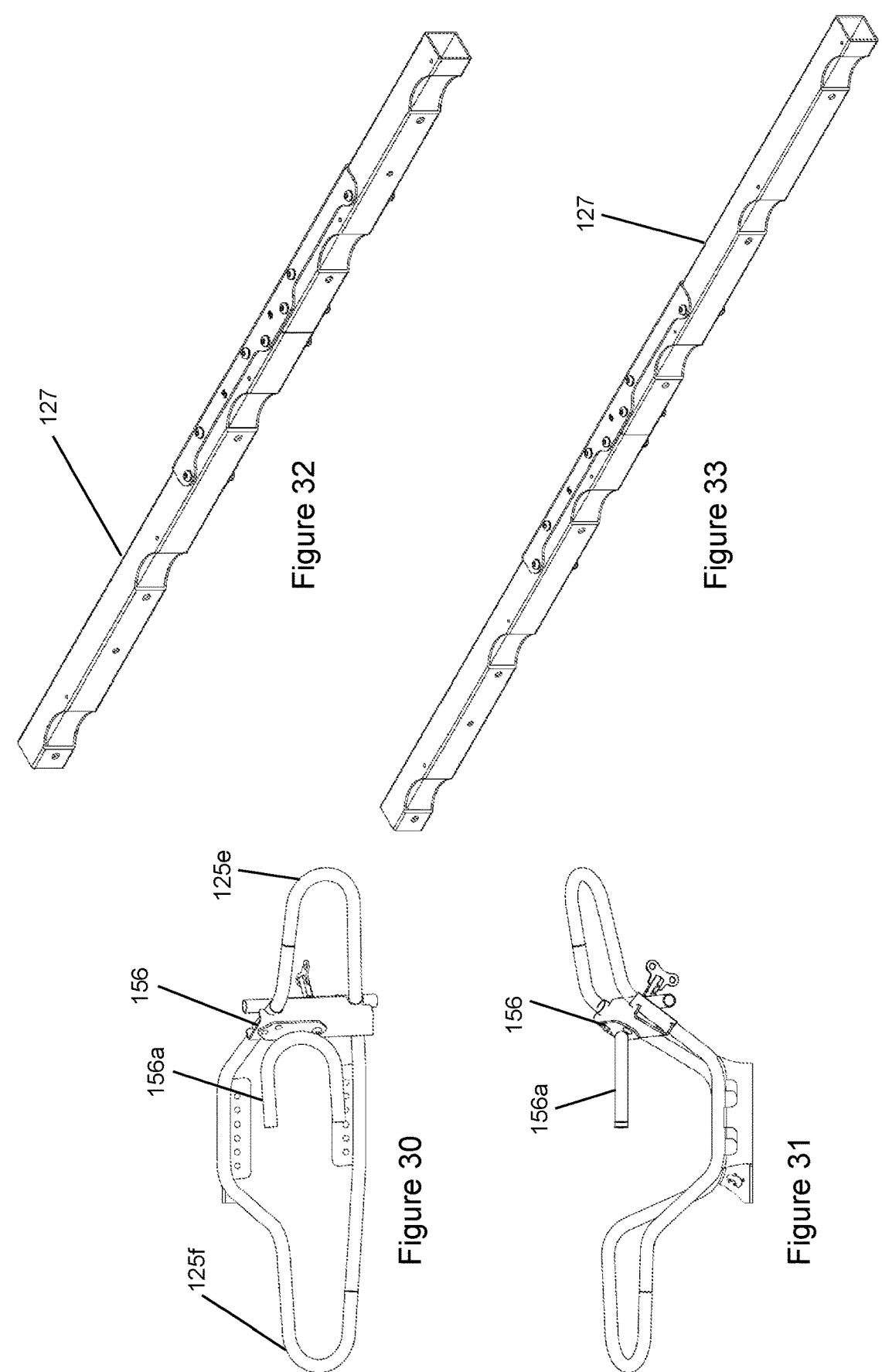
FIG. 30 shows a top view of the hoop portion with a small wheel spacer attached.
FIG. 31 shows a side view of the arrangement from FIG. 30.
FIG. 32 shows a lower mounting portion configured for use with five bikes.
FIG. 33 shows the lower mounting portion configured for use with six bikes.

In order to accommodate bikes with small wheels, an optional small wheel spacer 156 may be provided as shown in FIGS. 30 and 31. The small wheel spacer 156 extends between the first side portion 125*c* and the second side portion 125*d*. The small wheel spacer 156 has a U-shaped portion 156*a* that can be located inwardly of either of the front or rear portions 125*e*, 125*f*.

Figure 15:
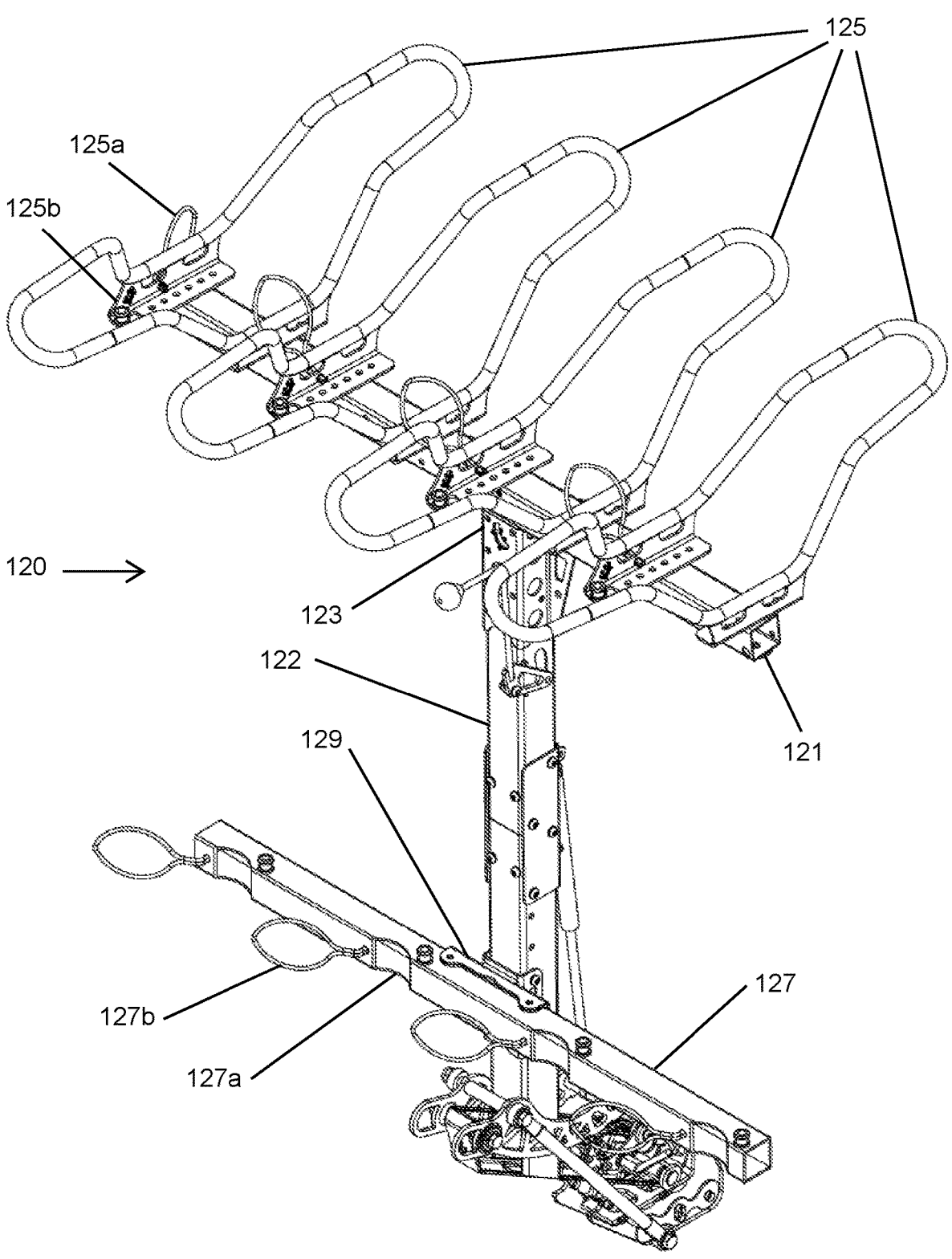
FIG. 15 shows an isometric view of the rack configured for carrying four bikes.
Figures 16, 17, 18:
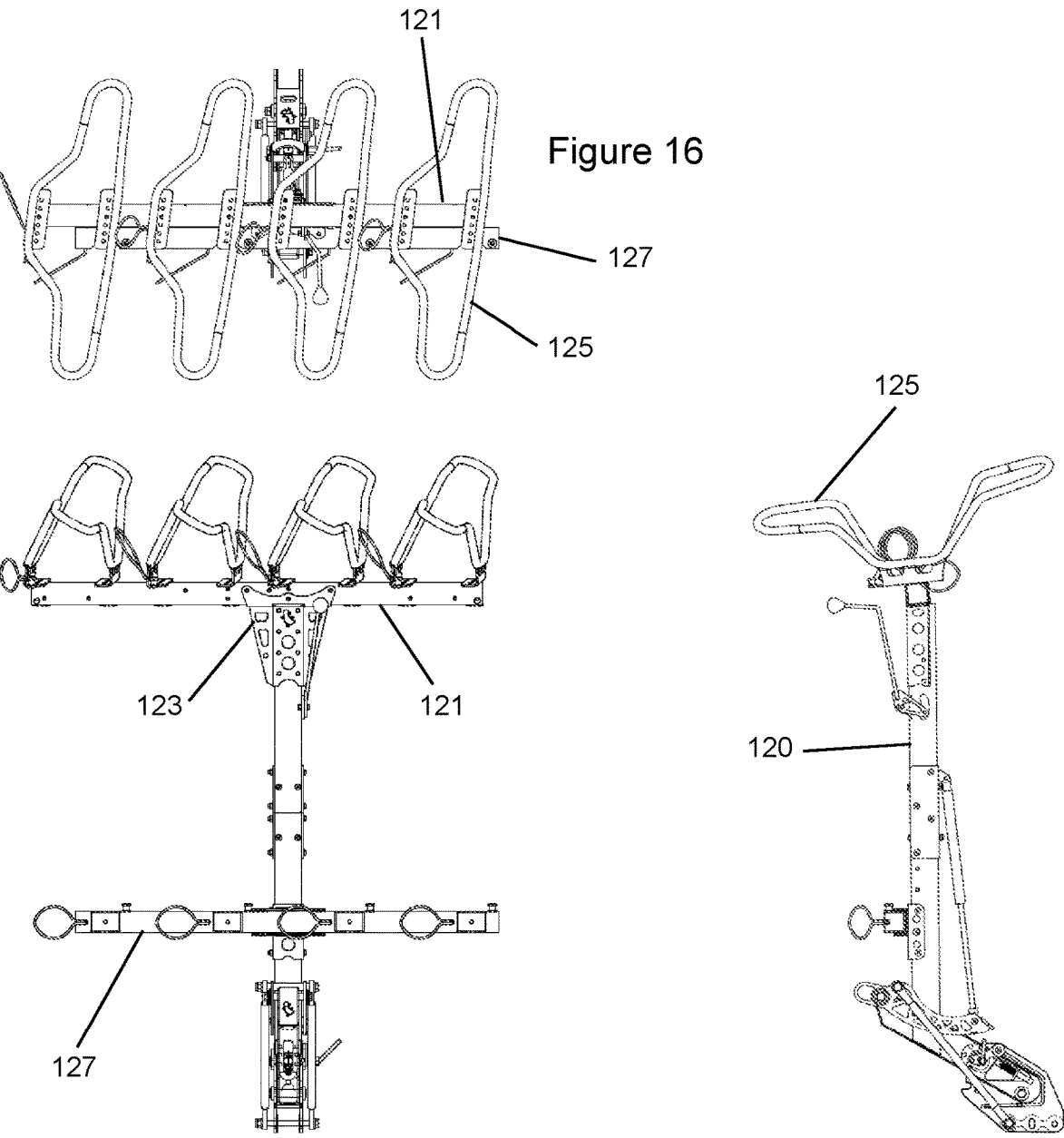
FIG. 16 shows a top view of the rack from FIG. 15.
FIG. 17 shows a rear view of the rack from FIG. 16.
FIG. 18 shows a side view of the rack from FIG. 16.

FIG. 15 also shows a lower mounting portion 127 for the carrier portion 120 of the rack 100. A rear wheel 200*b* of a bicycle to be mounted to the carrier portion 120 is locatable on the lower mounting portion 127. The lower mounting portion 127 has a plurality of spaced apart recessed portions 127*a* each for receiving a rear wheel of a respective one of the bicycles to be mounted to the carrier portion 120.

Figures 19, 20:
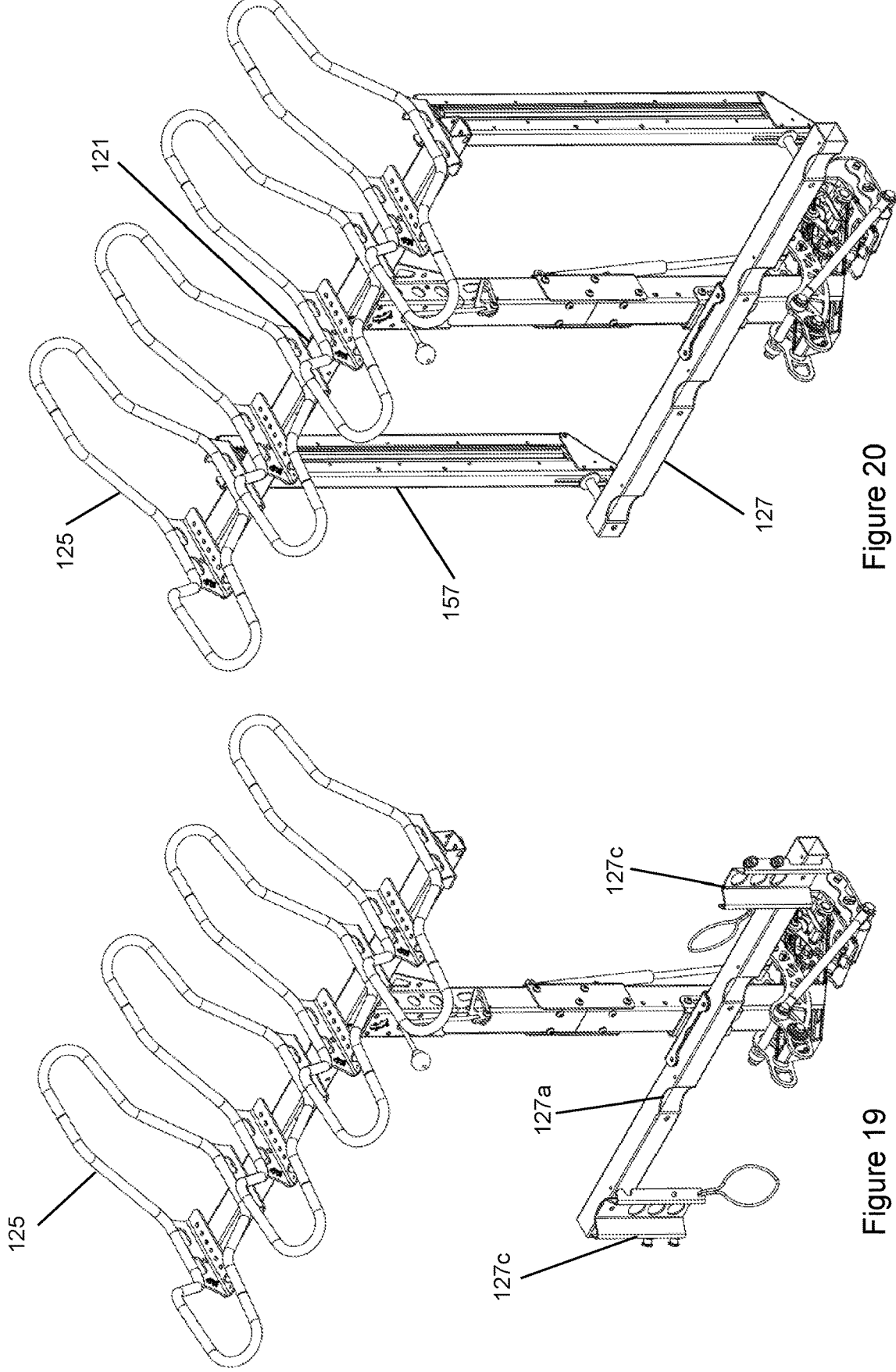
FIG. 19 shows an isometric view of the rack configured for carrying bikes of varying sizes.
FIG. 20 shows an isometric view of the rack configured for carrying bikes and/or snow equipment.

The lower mounting portion additionally has a plurality of cord portions 127*b* each near a respective one of the recessed portions 127*a* for securing the rear wheel in the respective recessed portion 127*a*. The lower mounting portion may be made from aluminium. Optionally, extensions 127*c* may be provided as shown in FIG. 19 to accommodate particularly long or short wheelbase bikes, or when bikes of different sizes are to be carried simultaneously.

The lower mounting portion 127 has a main elongate body portion that is coupled to the elongate support portion 122 by a second mounting coupling portion 129. The lower mounting portion 127 extends transversely to the elongate support portion 122. In particular, the lower mounting portion 127 extends substantially along a horizontal axis, while the elongate support portion 122 extends substantially along a vertical axis.

The second mounting coupling portion 129 allows for the lower mounting portion 127 to be adjusted relative to the elongate support portion 122. In particular, the second mounting coupling portion 123 is attachable along a length of the elongate support portion. The mounting coupling portion 129 may be a plate having a substantially diamond shape or rectangular shape with an aperture near each corner of the plate. A first pair of oppositely-diagonal apertures are each for receiving a fastener to secure second mounting coupling portion 129 to the lower mounting portion 127 and a second pair of oppositely-diagonal apertures are each for receiving a fastener to secure the second mounting coupling portion 129 to the elongate support portion 122. The elongate support portion 122 has a plurality of apertures along a length of the elongate support portion 122, the plurality of apertures including two or more pairs of apertures that are alignable with the second pair of apertures of the second mounting coupling portion 129 each for receiving the fastener.

Similar to the upper mounting portion 121, the lower mounting portion 127 has an adjustable length depending on the number of bicycles to be mounted thereon. In one example, the lower mounting portion 127 may have one or more extension portions that are engageable with the main elongate body portion to adjust the length of the lower mounting portion. Such an example is illustrated in FIGS. 32 and 33, where the example of FIG. 32 is configured for five bikes while the example of FIG. 33 is configured for six bikes.

Referring to FIG. 20, a snow equipment securing portion 157 may be provided that extends between the lower mounting portion 127 and the upper mounting portion 121 at each end thereof. FIGS. 36 to 39 illustrate the operation of the snow equipment securing portions 157 in more detail. Skis and/or snowboards can be clamped between a base 157a and an openable arm 157b, with the skis or snowboards extending approximately horizontally, parallel to the mounting portions 121, 127 and perpendicular to the elongate portion 122.

Referring to FIGS. 26 to 29, equipment securing portions 158 may be provided at either end of the upper mounting portion 121 for carrying of long items horizontally, parallel to the upper mounting portion 121. The equipment securing portions 158 include a base 158a on which the items can rest, and a cord 158b to hold the items in place. Equipment securing portions 158 may also be provided on the lower mounting portion 127 in addition or as an alternative.

FIGS. 40 to 45 show a tow bar-coupling portion 143 and componentry for securing the tow bar-coupling portion 143 to the vehicle. With reference to FIG. 42A, a fastener, in the form of bolt 143b, is passable laterally, along a horizontal axis, through the vehicle-coupling portion 143 to secure the vehicle-coupling portion to the tow portion of the vehicle. As shown in FIG. 44A, an internal nut 143d is provided that includes magnetic retainers 143e to hold the nut 143d in position prior to securing with bolt 143b.

With reference to FIGS. 42 to 45, a U-shape bolt 143f is locatable over the vehicle-coupling portion 143 and a support plate 143a is securably mounted to the U-shape bolt 143f on an underside of the vehicle-coupling portion 143. Thereby, the vehicle-coupling portion 143 would resist against any vertical movements of the rack relative to the vehicle.

Figure 42A:
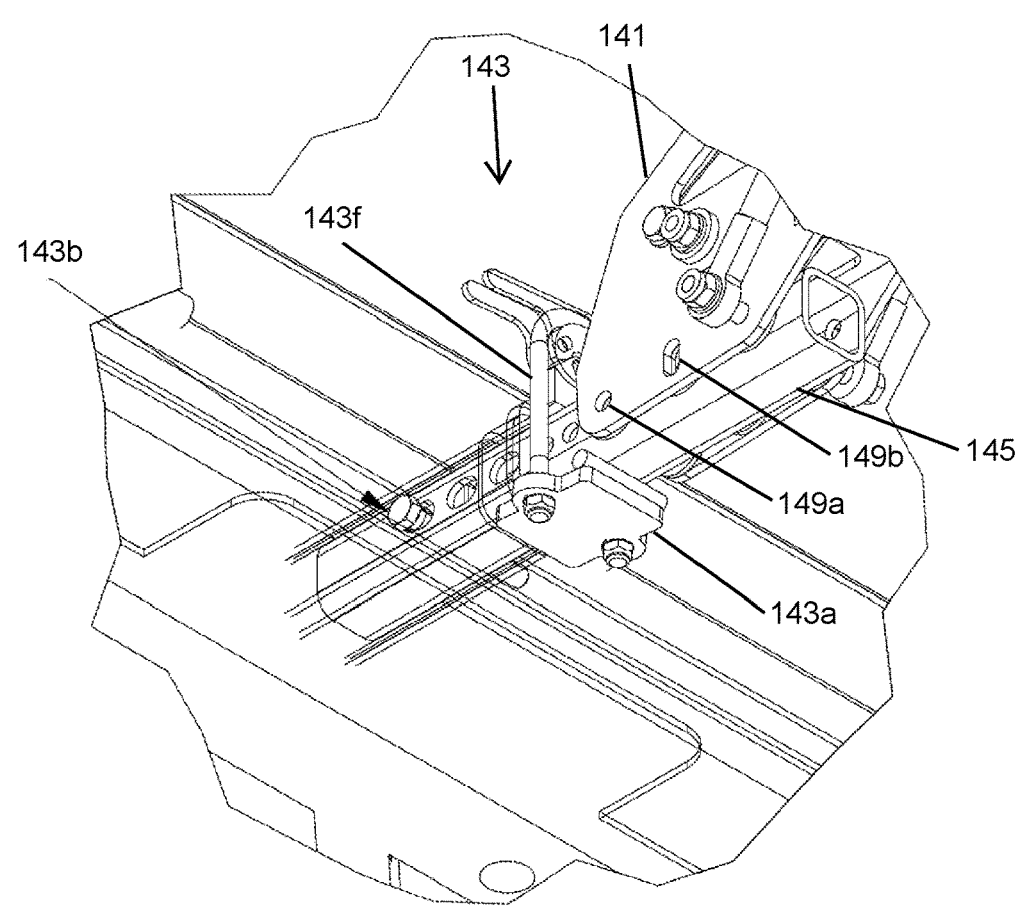
FIG. 42A shows an angled lower rear view of a vehicle-coupling portion of the rack.
Figure 42B:
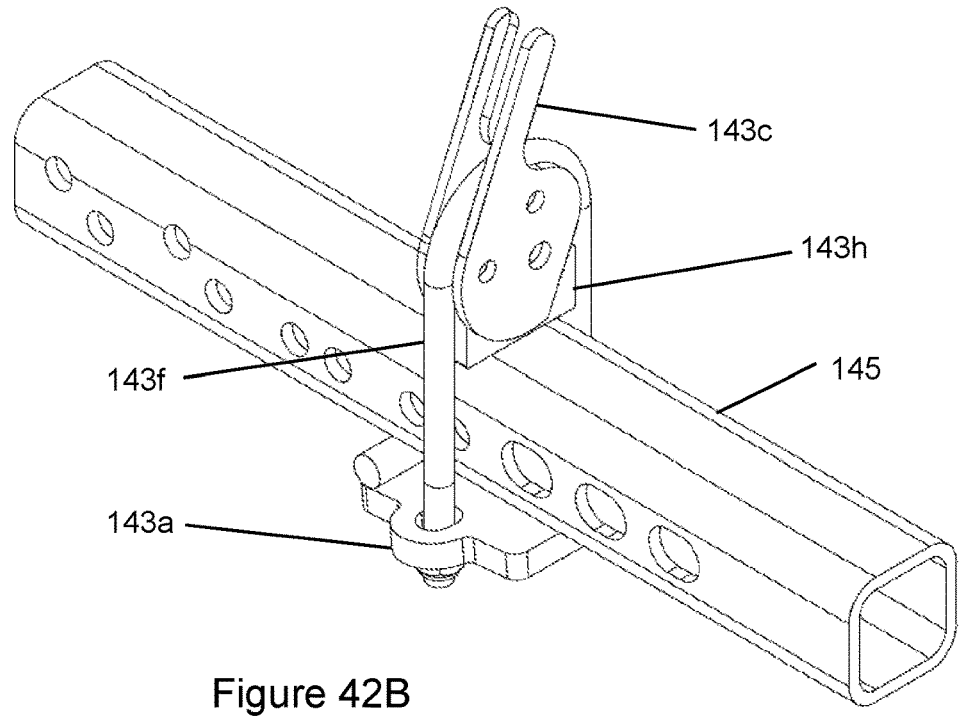
FIG. 42B shows an isometric view of the vehicle-coupling portion.
Figures 56, 57:
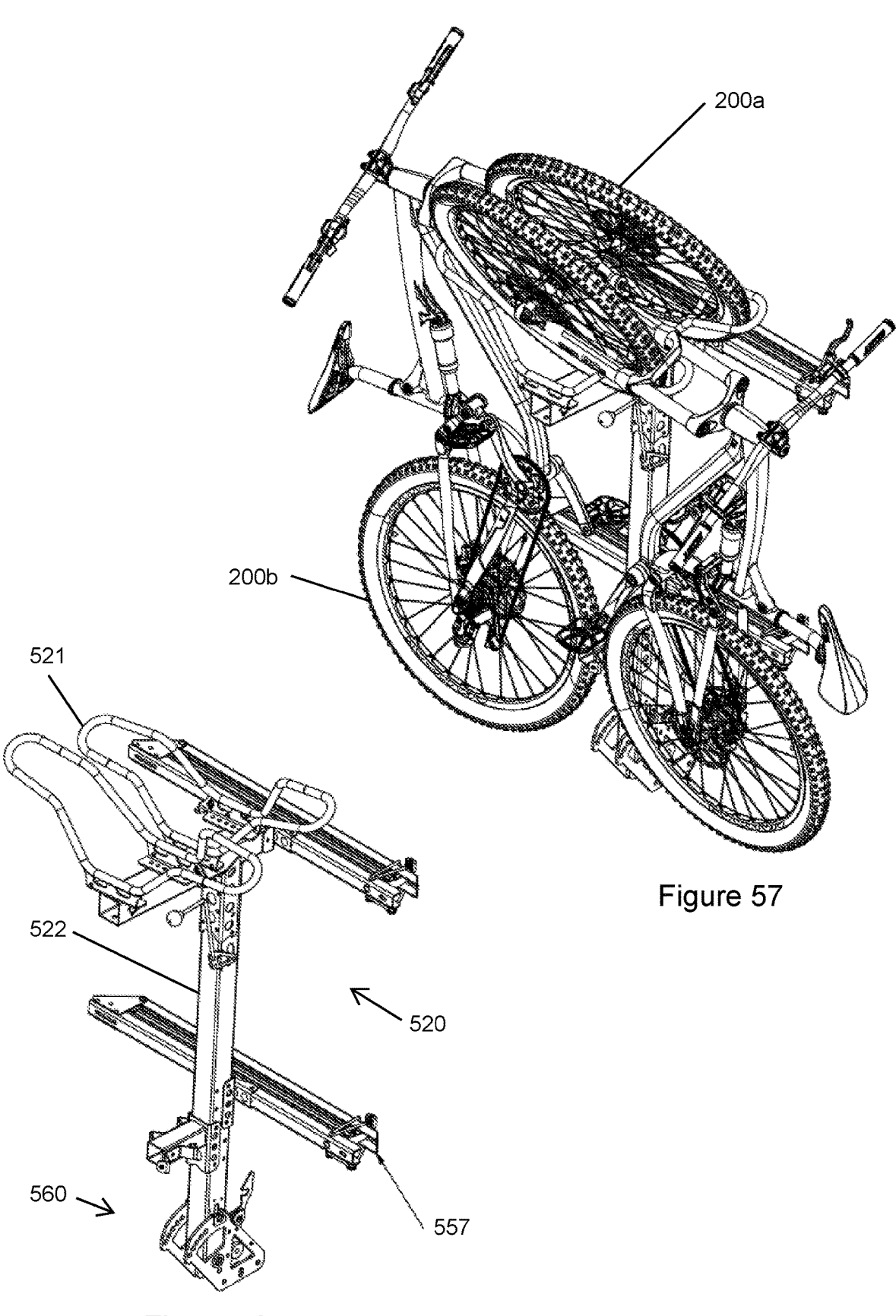

In the embodiment of FIGS. 42A, 42B and 43, a cam system 143c is also optionally provided to allow securing of the vehicle-coupling portion 143 without the need to release or secure nuts or use tools. As shown in FIG. 43, a handle of the cam 143c can be rotated as illustrated by the broken lines. As the cam 143c is rotated, a block 143h is forced downwardly against the tow bar-coupling portion 145.

Referring to FIG. 42A, the body portion 141 includes apertures 149a at a forward lower region of the body portion 141 and elongate aperture 149b at a central lower region of the body portion 141. The tow bar-coupling portion 145 is engageable with the forward aperture 149a but also in a chosen location within the elongate aperture 149b to adjust an angle of the carrier portion 120 relative to the vehicle. That is, the level of tilt of the carrier portion can be adjusted depending on the position within the elongate aperture 149b to which the tow bar-coupling portion 145 engages. FIGS. 44A and 45B also show a number of holes 143g that are provided to allow further configuration of the position of the body portion 141.

The design of the support plate 143a may be varied to suit particular vehicles. FIGS. 42A to 44B show a standard design, while FIGS. 45A to 45C show an alternative design configured for use on a vehicle with a different tow bar connector, in this case a Toyota 200 Series vehicle. It will be appreciated that various other designs may be required for various alternative vehicles.

FIGS. 46 to 57 show a rack 500 according to another embodiment of the present invention. Similar to the previous embodiments, the rack 500 includes a carrier portion 520 and a vehicle-coupling portion 540. The carrier portion 520 is adjustable relative to the vehicle-coupling portion 540 between a substantially upright position and a lowered position. The carrier portion is in particular pivotable relative to the vehicle-coupling portion.

The rack 500 includes a linkage 560 in the form a pair of spaced apart bracket plates, wherein a portion of the vehicle-coupling portion 540 and a portion of the carrier portion 520 are located in the space between the bracket plates. The carrier portion 520 is pivotably coupled to the linkage 560.

The rack 500 further includes a locking portion 580 for securing the carrier portion 520 relative to the linkage 560. The locking portion 580 is an elongate member that passes through the bracket plates of the linkage 560 to trap the carrier portion 520 in the substantially upright position. When the locking portion 580 is removed by activation of the handle 584, the carrier portion 520 would drop to the lowered position. In this regard, the operation of the locking portion 580 is largely similar to that described previously in relation to other embodiments.

Similar to previous embodiments, the locking portion 580 is biased by a spring 583 and connected to the handle 584 by a coupler 585a and rod 585b. In the present embodiment, however, a pin can be provided in any one of a plurality of holes 550 to limit the location of the lowered position, rather than the carrier portion 520 being locked in the lower position by the locking portion 580.

In the embodiment of FIGS. 53 to 57, the carrier portion 520 is configured to receive bicycles at a 90° angle compared to the orientation of the bicycles received by the carrier portion of the racks of previously-described embodiments. In particular, the bicycles when mounted to the rack 500 are mounted sidewardly onto the rack, instead of being mounted forwardly onto the rack as in the previously described embodiments.

The carrier portion 520 includes an elongate body portion 522 and an upper mounting portion 523 that extends longitudinally in a forward to rear direction. The upper mounting portion 523 includes a pair of spaced apart hoop portions 521 along a length thereof each for receiving a front wheel of a respective bicycle. The hoop portions 521 are laterally oriented so as to receive the wheels at a 90° angle relative to the vehicle. The hoop portions 521 may also be rotated by 180°, allowing the front wheel of the bicycle to angle towards or away from the vehicle.

The carrier portion additionally includes a bracket portion 527 along a length of the elongate body portion 522 for receiving rear wheels of the bicycles. The bracket portion 527 is adjustable along a length of the elongate body 522 depending on the size of the bicycles to be mounted to the carrier portion.

The carrier portion further additionally includes snow equipment securing portions 557 on the elongate body portion 522 and the upper mounting portion 523. It will be appreciated, however, that both snow equipment securing portions 557 may alternatively be mounted on the elongate body portion 522. In this embodiment, the snow equipment securing portions 557 are substantially perpendicular to the elongate body portion 522, such that snowboards and/or skis substantially parallel to the elongate body portion 522 when secured to the rack 500.

While this embodiment has the upper mounting portion extending in a forward to rear direction, it will be appreciated that the upper mounting portion could alternatively be mounted in a side to side orientation similar to previously described embodiments. Similarly, while this embodiment does not include any spring and/or dampening link mechanism as previously described, it will be appreciated that such a mechanism could be used here. However, the present embodiment as described may be advantageous in some circumstances, such as when a lightweight, simpler and/or cheaper rack is desired.

Figure 61:
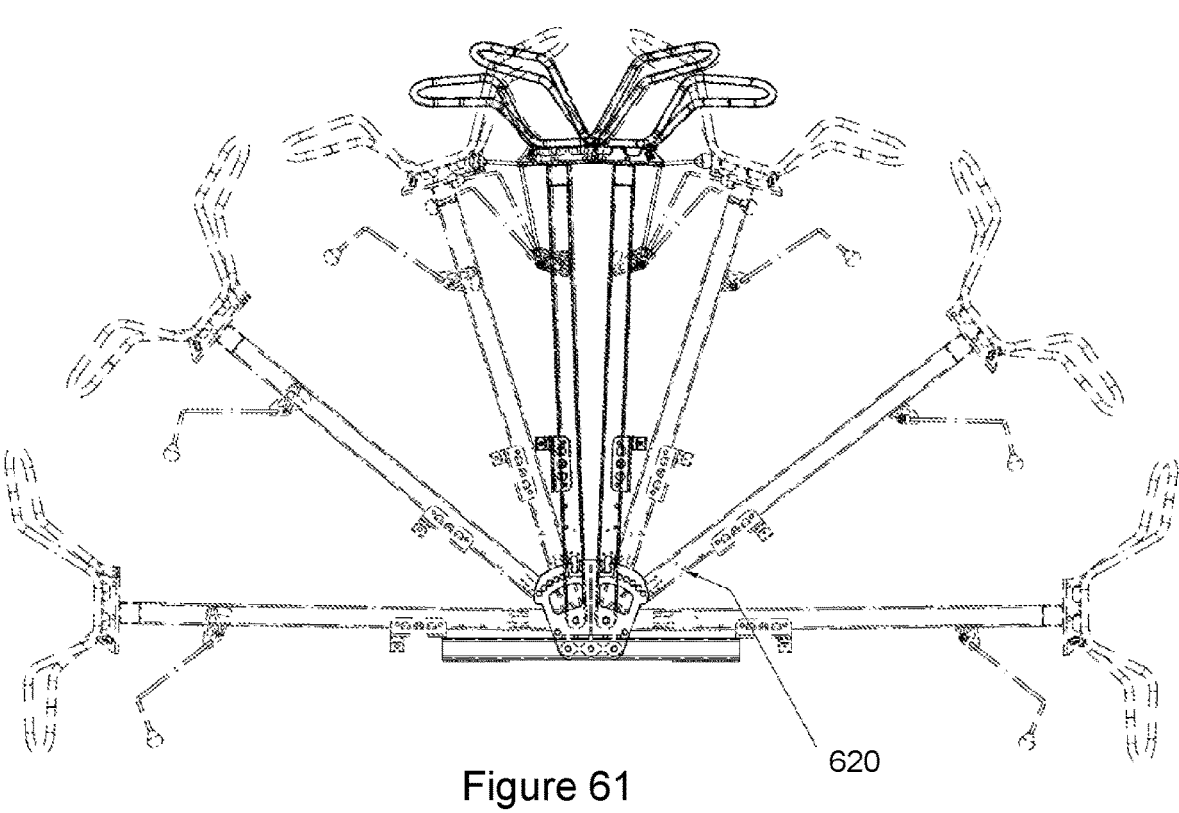
FIG. 61 shows a rear view of the rack from FIG. 58 in a substantially upright position, with broken lines illustrating various lowered positions.
Figure 62:
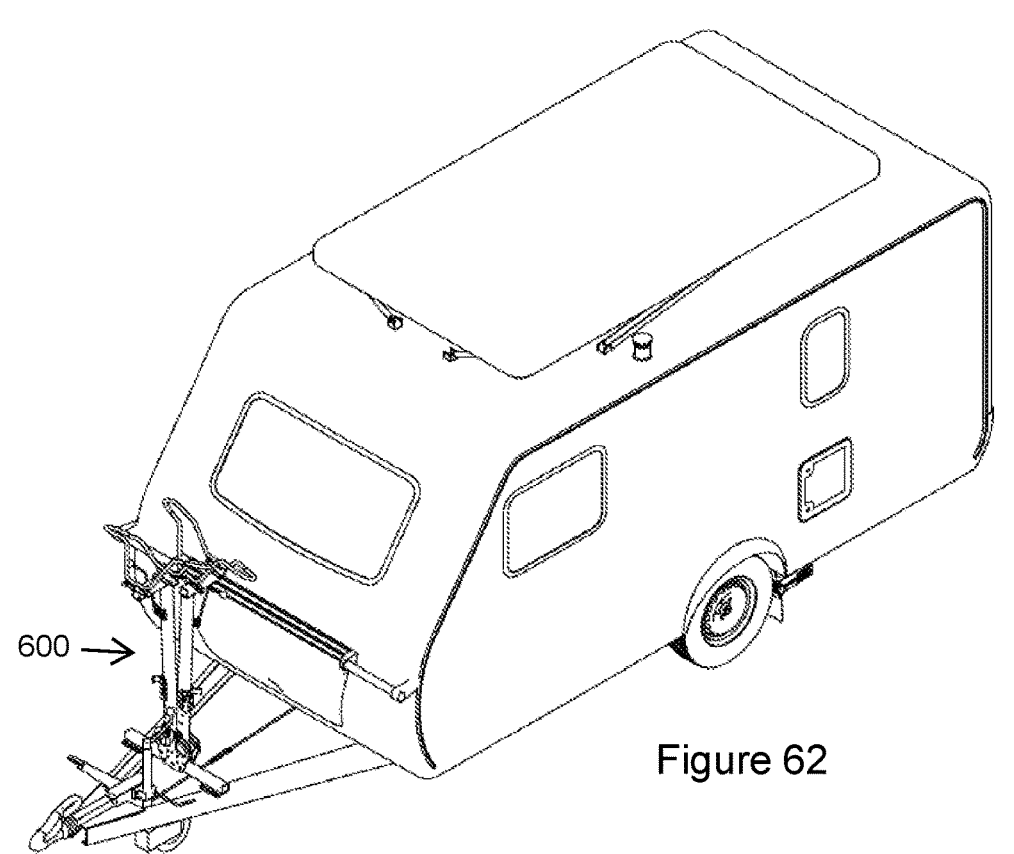
FIG. 62 shows an isometric view of the rack from FIG. 58 mounted to a caravan.

FIGS. 58 to 62 show a rack 600 according to another embodiment of the present invention. In this embodiment, two carrier portions 620 are provided, each being configured to receive a bicycle. The rack 600 is intended to be mounted at a 90° angle compared to the orientation of the racks of previously-described embodiments. This is shown in FIG. 62, for example, where the rack 600 is mounted to a caravan.

In particular, the bicycles when mounted to the rack 600 are mounted sidewardly relative to the direction of travel, instead of being mounted forwardly onto the rack as in the previously described embodiments. The carrier portions are lowered in opposite directions, as shown in FIG. 61, allowing loading and unloading of a bicycle from either side of the caravan or other vehicle.

Figures 58, 59, 60:
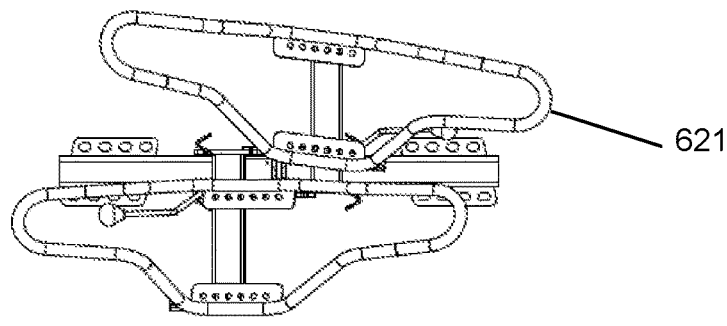
FIG. 58 shows a top view of another embodiment of the rack.
FIG. 59 shows a rear view of the rack from FIG. 58.
FIG. 60 shows a side view of the rack from FIG. 58.

The carrier portions 620 each include an elongate body portion 622 and an upper mounting portion that extends longitudinally in a forward to rearward direction, offset in a forward and rearward direction as shown in FIG. 60. Each upper mounting portion includes a hoop portion 621 for receiving a front wheel of a respective bicycle.

The hoop portions 621 are laterally oriented so as to receive the wheels at a 90° angle relative to the vehicle. The hoop portions 621 may be rotated by 180°, allowing the front wheel of the bicycle to angle towards or away from the vehicle. The carrier portions additionally each include a bracket portion 627 along a length of the elongate body portion each for receiving a rear wheel of a respective bicycle. The bracket portions 627 are adjustable along a length of the elongate body depending on the size of the bicycle to be mounted to the carrier portion.

Once again, while this embodiment does not include any spring and/or dampening link mechanism as previously described, it will be appreciated that such a mechanism could be used.

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

In the foregoing description of preferred embodiments, specific terminology has been resorted to for the sake of clarity. However, the invention is not intended to be limited to the specific terms so selected, and it is to be understood that each specific term includes all technical equivalents which operate in a similar manner to accomplish a similar technical purpose. Terms such as "front" and "rear", "inner" and "outer", "above" and "below" and the like are used as words of convenience to provide reference points and are not to be construed as limiting terms.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

Throughout this specification and the claims which follow, unless the context requires otherwise, the word 'comprise', and variations such as 'comprises' and 'comprising', will be understood to imply the inclusion of a stated integer or step or group of integers or steps but not the exclusion of any other integer or step or group of integers or steps.

The claims defining the invention are as follows:

1. A bike rack comprising: a mounting portion to which a wheel of a bike is mountable, the mounting portion including:

a body portion on which a wheel of a bike is locatable, the body portion comprising a plurality of apertures; and a wheel-receiving portion, a wheel of a bike being receivable by the wheel-receiving portion, the wheel-receiving portion being engageable with the body portion and comprising:

a first base portion and a second base portion spaced apart from each other, each of the first and the second base portion being mountable to a horizontally extending elongate body portion of the bike rack, wherein the first and the second base portions comprise a bracket portion including a plurality of apertures, at least two of the plurality of apertures of the bracket portion being alignable with at least two of the plurality of apertures of the body portion, wherein a fastener is insertable into aligned apertures to secure a position of the wheel-receiving portion relative to the body portion;

a front portion configured to receive a first portion of the wheel, the front portion including a pair of spaced apart arm portions between which the first portion of the wheel is receivable, each of the spaced apart arm portions directly extending from the first and the second base portions respectively; and a rear portion configured to receive a second portion of the wheel, the rear portion having a pair of spaced apart arm portions between which the second portion of the wheel is receivable, each of spaced apart arm portions directly extending from the first and the second base portions respectively, wherein, for at least one of the front portion and rear portion of the wheel-receiving portion, the pair of spaced apart arm portions are tapered towards each other at free ends thereof away from the first and the second base portions so as to clamp edges of the respective wheel portion located therebetween.

2. The bike rack of claim 1, wherein the at least one of the front portion and rear portion of the wheel-receiving portion comprises an end portion such that the pair of spaced apart arm portions and the end portion form a U-shape profile, the arm portions being tapered towards the end portion.

3. The bike rack of claim 2, wherein an axis along which the end portion extends is at an angle relative to the elongate body portion.

4. The bike rack of claim 3, wherein the axis along which the end portion extends is between about 30° to 60° relative to the elongate body portion when the first and the second base portions are mounted thereto.

5. The bike rack of claim 3, wherein the axis along which the end portion extends is parallel to an axis of rotation of the wheel received by the wheel-receiving portion.

6. The bike rack of claim 1, wherein the at least one of the front portion and rear portion is both of the front portion and rear portion.

7. The bike rack of claim 1, wherein the front portion and the rear portion together form a continuous hoop.

8. The bike rack of claim 1, wherein the wheel-receiving portion is adjustable rearwardly or forwardly relative to the body portion in a direction transverse to an elongate extent thereof.

9. The bike rack of claim 1, wherein the wheel-receiving portion is adjustable rotationally relative to the body portion about a rotational axis that is perpendicular to a longitudinal axis of the body portion.

10. The bike rack of claim 1, further comprising one or more removable inserts to narrow the front and/or rear portion of the wheel-receiving portion.

11. A bike rack comprising: a mounting portion to which a wheel of a bike is mountable, the mounting portion comprising an elongate body portion on which a wheel of a bike is locatable, wherein the elongate body portion comprises a plurality of apertures; and a wheel-receiving portion in which the wheel of the bike is locatable, the wheel-receiving portion comprising:

a first base portion and a second base portion spaced apart from each other, each of the first and the second base portion being mounted or mountable to the elongate body portion, wherein the first and the second base portions comprise a bracket portion comprising a plurality of apertures, at least two of the plurality of apertures of the bracket portion being alignable with at least two of the plurality of apertures of the body portion, wherein a fastener is insertable into aligned apertures to secure a position of the wheel-receiving portion relative to the elongate body portion;

a front portion configured to receive a first portion of the wheel, the front portion including a pair of spaced apart arm portions between which the first portion of the wheel is receivable, each of the spaced apart arm portions directly extending from the first and the second base portions respectively; and a rear portion configured to receive a second portion of the wheel, the rear portion having a pair of spaced apart arm portions between which the second portion of the wheel is receivable, each of the spaced apart arm portions directly extending from the first and the second base portions respectively, wherein, for at least one of the front portion and rear portion of the wheel-receiving portion, the pair of spaced apart arm portions are tapered towards each other away at free ends thereof away from the first and the second base portions so as to clamp edges of the respective wheel portion located therebetween.

12. The bike rack of claim 11, wherein the at least one of the front portion and rear portion of the wheel-receiving portion comprises an end portion such that the pair of spaced apart arm portions and the end portion form a U-shape profile, the arm portions being tapered towards the end portion.

13. The bike rack of claim 12, wherein an axis along which the end portion extends is at an angle relative to the elongate body portion.

14. The bike rack of claim 13, wherein the axis along which the end portion extends is between about 30° to 60° relative to the elongate body portion.

15. The bike rack of claim 13, wherein the axis along which the end portion extends is parallel to an axis of rotation of the wheel received by the wheel-receiving portion.

16. The bike rack of claim 11, wherein the at least one of the front portion and rear portion is both of the front portion and rear portion.

17. The bike rack of claim 11, wherein the wheel-receiving portion is adjustable rotationally relative to the body portion about a rotational axis that is perpendicular to a longitudinal axis of the body portion.

18. The bike rack of claim 11, wherein the wheel-receiving portion is adjustable rearwardly or forwardly relative to the body portion in a direction transverse to an elongate extent thereof.

* * * * *